(12) United States Patent
Nampo et al.

(10) Patent No.: US 11,868,830 B2
(45) Date of Patent: Jan. 9, 2024

(54) INFORMATION PROCESSING DEVICE GENERATING FIRST PRINT DATASET AND SECOND PRINT DATASET BY USING APPEARANCE IMAGE CONFIGURED OF A PLURALITY OF COLORS

(71) Applicant: BROTHER KOGYO KABUSHIKI KAISHA, Nagoya (JP)

(72) Inventors: Hiromichi Nampo, Kiyosu (JP); Koichi Kondo, Inuyama (JP); Tomoyasu Fukui, Inuyama (JP); Ryuichi Kanda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 20 days.

(21) Appl. No.: 17/687,995

(22) Filed: Mar. 7, 2022

(65) Prior Publication Data

US 2022/0327337 A1 Oct. 13, 2022

(30) Foreign Application Priority Data

Mar. 30, 2021 (JP) ................................ 2021-058285

(51) Int. Cl.
*G06K 15/02* (2006.01)
*B41J 3/407* (2006.01)

(52) U.S. Cl.
CPC .......... *G06K 15/024* (2013.01); *B41J 3/4075* (2013.01); *G06K 15/023* (2013.01); *G06K 15/186* (2013.01); *G06K 15/1809* (2013.01); *G06K 15/1822* (2013.01); *G06K 15/1852* (2013.01); *G06K 15/1882* (2013.01)

(58) Field of Classification Search
CPC .. G06K 15/022; G06K 15/023; G06K 15/024; G06F 3/1251; G06F 3/1204; G06F 3/1208; G06F 3/125; G06F 3/1256; B41J 3/4075
USPC ................................................ 358/1.15, 1.18
See application file for complete search history.

(56) References Cited

U.S. PATENT DOCUMENTS

2002/0197090 A1* 12/2002 Akaiwa .................. B41J 3/4075
400/615.2
2016/0246555 A1* 8/2016 Tsuji ..................... G06F 3/1251
(Continued)

FOREIGN PATENT DOCUMENTS

JP      H09-234934 A    9/1997
JP      2010-017937 A   1/2010
(Continued)

*Primary Examiner* — Kent Yip
(74) *Attorney, Agent, or Firm* — KENEALY VAIDYA LLP

(57) ABSTRACT

An information processing device includes a controller. The controller acquires an appearance image configured of a plurality of colors, identifies the plurality of colors configuring the acquired appearance image, and specifying a plurality of printing medium types based on the plurality of identified colors. The plurality of printing medium types includes a first printing medium type and a second printing medium type. The controller generates a first print dataset and a second print dataset by using the appearance image. The first print dataset corresponds to the specified first printing medium type. The second print dataset corresponds to the specified second printing medium type.

15 Claims, 14 Drawing Sheets

(56) References Cited

U.S. PATENT DOCUMENTS

2020/0406633 A1* 12/2020 Yuasa .................. G06F 3/1285
2021/0165618 A1* 6/2021 Osuka .................. G06F 3/1256

FOREIGN PATENT DOCUMENTS

| JP | 2013-43300 A | 3/2013 |
| JP | 2021-9498 A | 1/2021 |

* cited by examiner

FIG. 7

CARTRIDGE MANAGEMENT TABLE

| No. | MODEL NUMBER OF CARTRIDGE | TAPE WIDTH | TAPE COLOR | PRINTING COLOR | USAGE HISTORY |
|---|---|---|---|---|---|
| 1 | CTG00001 | **mm | WHITE | BLACK | ☑ |
| 2 | CTG00002 | **mm | WHITE | RED | ☑ |
| 3 | CTG00003 | **mm | WHITE | BLUE | ☐ |
| 4 | CTG00004 | **mm | WHITE | YELLOW | ☐ |
| 5 | CTG00005 | **mm | WHITE | GREEN | ☑ |
| ... | ... | | | | ... |

CASE THAT PARTIAL LAMINATION SETTING
FOR TEXT OBJECT IS ENABLED

CASE THAT BACKGROUND OF TEXT OBJECT IS
SINGLE COLOR AND PARTIAL LAMINATION SETTING
FOR TEXT OBJECT IS DISABLED (3-LAYER COMPOSITE LABEL)

· BLUE VERTICAL STRIPES

INFORMATION PROCESSING DEVICE GENERATING FIRST PRINT DATASET AND SECOND PRINT DATASET BY USING APPEARANCE IMAGE CONFIGURED OF A PLURALITY OF COLORS

CROSS REFERENCE TO RELATED APPLICATION

This application claims priority from Japanese Patent Application No. 2021-058285 filed Mar. 30, 2021. The entire content of the priority application is incorporated herein by reference.

BACKGROUND

In a conventional technology, images are printed on a plurality of tape segments using a tape printer to create printed segments of tape. Subsequently, the user creates a label by overlaying the printed tape segments on each other. This technology also includes an image display apparatus that displays an editing screen for editing a tape print image. When there is a plurality of tape print images, the user can switch among the tape print images by selecting a screen display tab. Through another operation, the user can display a composite image, in which the tape print images are superimposed, in a composite image display screen different from the editing screen.

SUMMARY

However, the composite image is not displayed in the conventional technology described above until creating the plurality of tape print images is completed. In other words, a user must consider on their own what colors and designs to use on each print label and how the print labels should be overlaid in order to construct a composite label with the desired appearance. Next, the user must edit the content for each label before creating the print labels. Thus, the user must undertake complex operations in order to create individual print labels for forming a set of images when the print images are combined.

In view of the foregoing, it is an object of the present disclosure to provide a technology that can facilitate a user in creating a plurality of print labels used for forming an image by combining a plurality of print images.

In order to attain the above and other objects, one aspect of the disclosure provides a non-transitory computer readable storage medium storing a set of program instructions installed on and executed by a computer provided in an information processing device. The set of program instructions includes: acquiring an appearance image configured of a plurality of colors; identifying the plurality of colors configuring the acquired appearance image; specifying a plurality of printing medium types based on the plurality of identified colors, the plurality of printing medium types including a first printing medium type and a second printing medium type; and generating a first print dataset and a second print dataset by using the appearance image, the first print dataset corresponding to the specified first printing medium type, the second print dataset corresponding to the specified second printing medium type. Accordingly, the configuration described above can facilitate a user in creating a plurality of print labels used for forming an image by combining a plurality of print images.

According to another aspect, the disclosure provides an information processing device. The information processing device includes a controller configured to perform: acquiring an appearance image configured of a plurality of colors; identifying the plurality of colors configuring the acquired appearance image; specifying a plurality of printing medium types based on the plurality of identified colors, the plurality of printing medium types including a first printing medium type and a second printing medium type; and generating a first print dataset and a second print dataset by using the appearance image, the first print dataset corresponding to the specified first printing medium type, the second print dataset corresponding to the specified second printing medium type. Accordingly, the configuration described above can facilitate a user in creating a plurality of print labels used for forming an image by combining a plurality of print images.

BRIEF DESCRIPTION OF THE DRAWINGS

The particular features and advantages of the disclosure as well as other objects will become apparent from the following description taken in connection with the accompanying drawings, in which:

FIG. 7 is an explanatory diagram schematically illustrating a cartridge management table;

DETAILED DESCRIPTION

Figure 1:
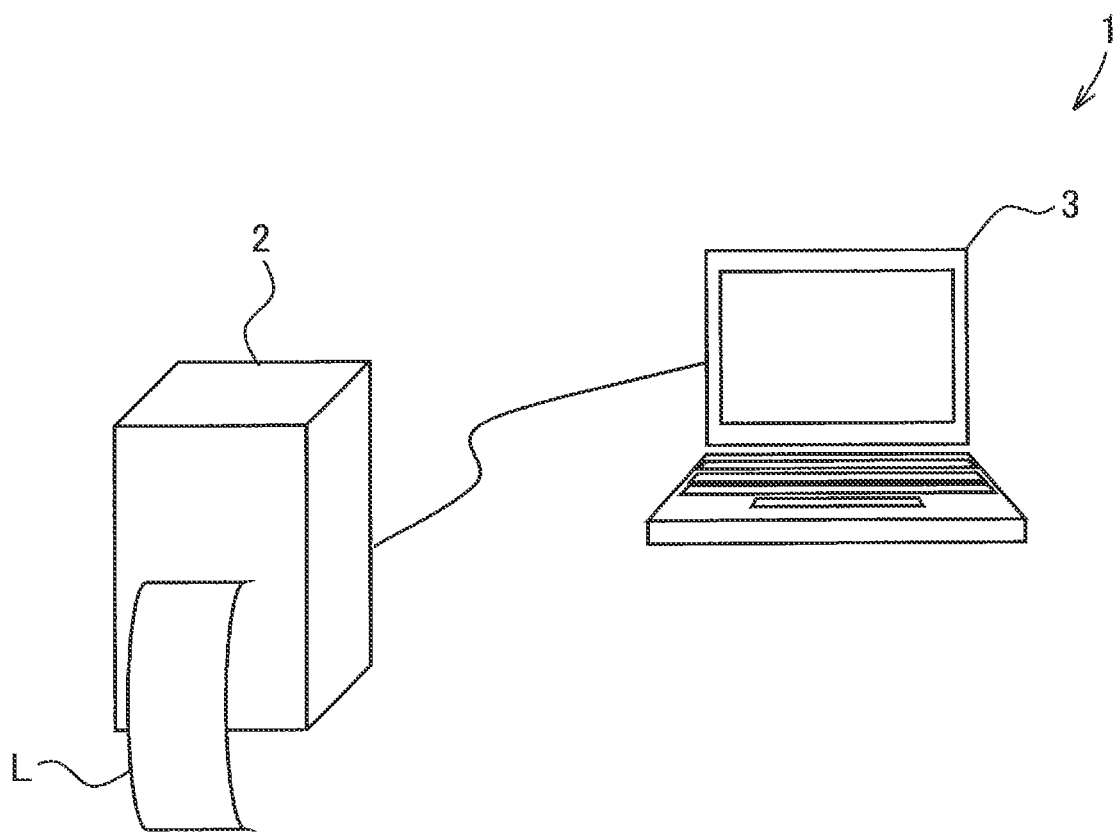
FIG. 1 is a schematic diagram illustrating an overall configuration of a printing system.

The first embodiment of the present disclosure will be described while referring to the drawings.

Overall Configuration of a Printing System

FIG. 1 shows the overall configuration of a printing system 1 according to the present embodiment. In FIG. 1, the printing system 1 has a label printer 2, and an operation terminal 3, for example. The operation terminal 3 includes a common personal computer. The operation terminal 3 is connected to and capable of exchanging information with the label printer 2. In the example depicted in FIG. 1, the operation terminal 3 is connected to the label printer 2 via a wired connection. However, while not illustrated in the drawing, the operation terminal 3 may be connected to the label printer 2 via a wireless connection. In addition to the common personal computer described above, the operation terminal 3 could be configured of a portable terminal such as a smartphone or a tablet computer. The wired connection may be achieved with a wired LAN technology, such as Ethernet (registered trademark), or a USB connection. The wireless connection may be achieved according to a wireless LAN, such as Wi-Fi (registered trademark), or Bluetooth (registered trademark). The label printer 2 creates print labels L based on user operations on the operation terminal 3. Here, the label printer 2 is an example of the printing device, the operation terminal 3 is an example of the information terminal, and both the operation terminal 3 and the label printer 2 are examples of the information processing devices.

Operation Terminal

Figure 2:
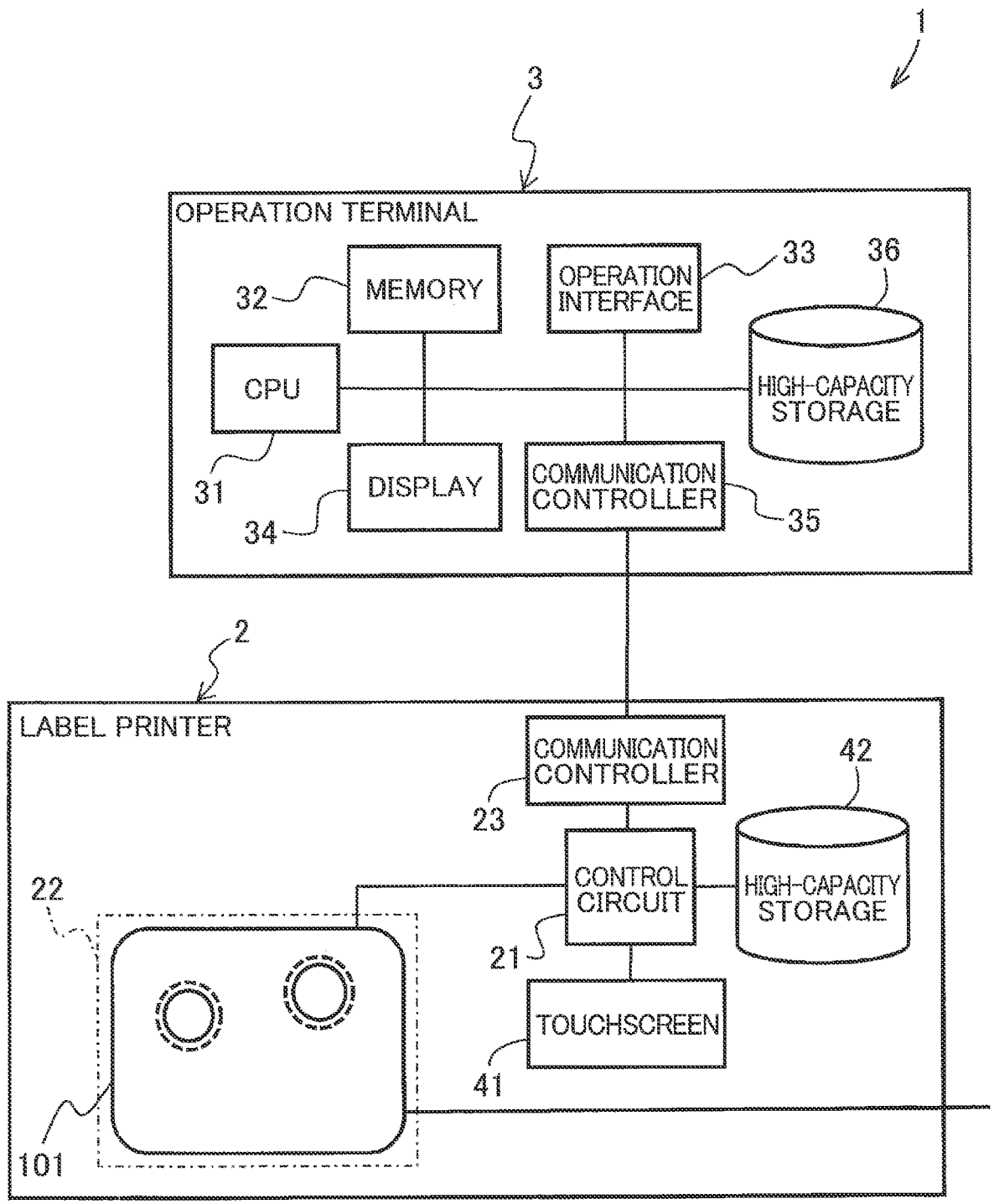
FIG. 2 is a block diagram illustrating configurations of an operation terminal and a label printer.

As shown in FIG. 2, the operation terminal 3 is provided with a CPU 31, a memory 32, an operation interface 33, a display 34, a communication controller 35, and a high-capacity storage 36. The memory 32 is configured of RAM and ROM, for example.

The operation interface 33 includes a mouse and keyboard, for example. The user inputs instructions, information, and the like into the operation terminal 3 via the operation interface 33. The display 34 includes a liquid crystal display, for example. The display 34 displays various information and messages. The communication controller 35 controls the exchange of signals with the label printer 2 through wired communication in this example. The high-capacity storage 36 stores various programs and information. The CPU 31 uses the temporary storage function of the RAM in the memory 32 to perform various processes and to exchange various signals with the label printer 2 according to programs pre-stored in the ROM of the memory 32 or the high-capacity storage 36. In this example, a print data editing program, object data, a cartridge management table, and the like described later are stored in the memory 32 or the high-capacity storage 36 in advance.

Label Printer

As shown in FIG. 2, the label printer 2 has a control circuit 21, a cartridge holder 22, a communication controller 23, a touchscreen 41, and a high-capacity storage 42. A cartridge 101 is detachably mountable in the cartridge holder 22. The label printer 2 can exchange information with the operation terminal 3 when the control circuit 21 connects to the communication controller 35 of the operation terminal 3 via the communication controller 23. The touchscreen 41 is configured by combining a liquid crystal display with a touchpad. The touchscreen 41 displays various information and messages and accepts user input of commands and the like at operated positions on the display screen. In this example, object data, a cartridge management table, and the like described later are stored in the high-capacity storage 42 in advance.

The CPU 31 is an example of a controller, and the display 34 is an example of a display.

Cartridge and Cartridge Holder

Figure 3:
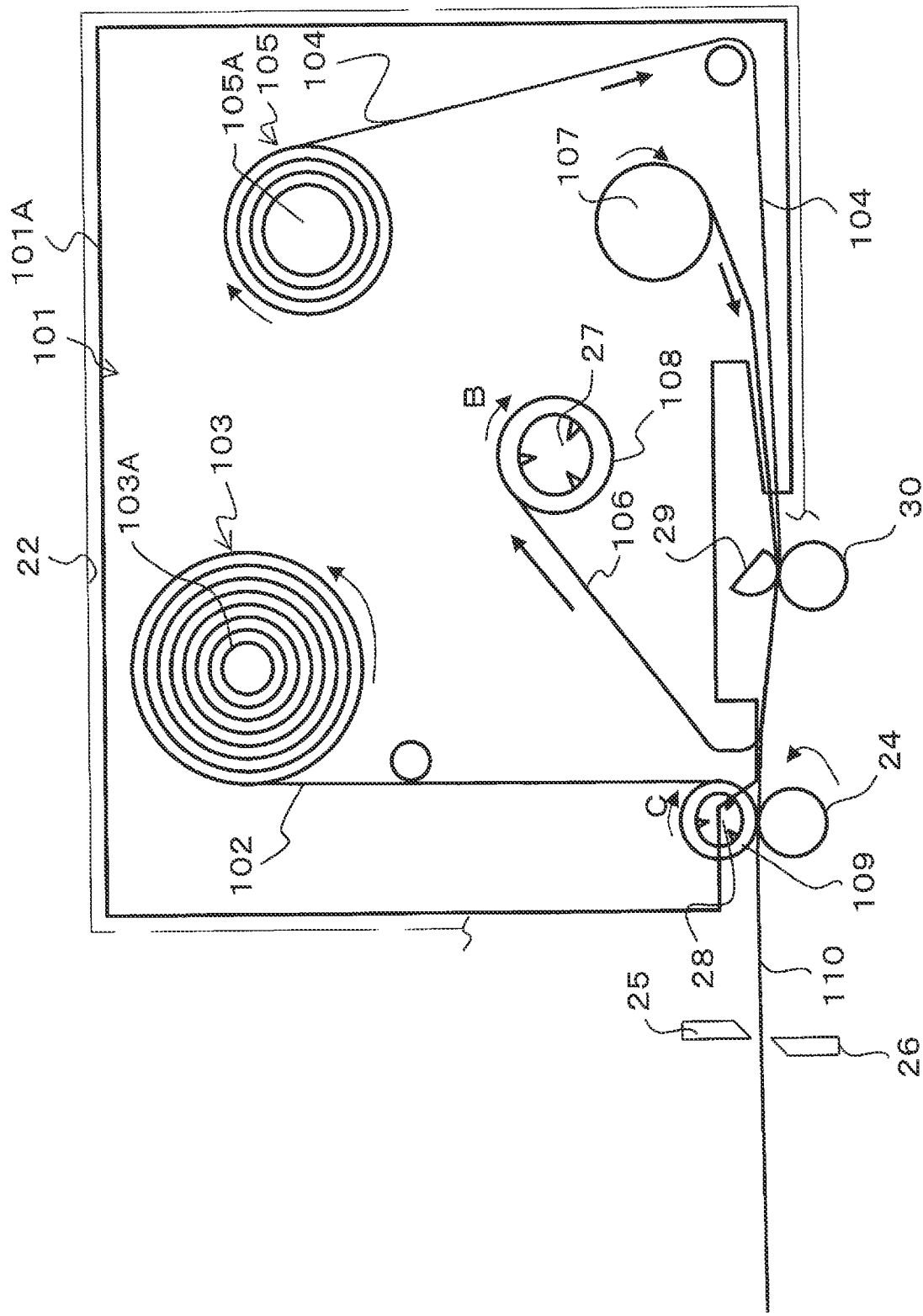
FIG. 3 is an explanatory diagram schematically illustrating an internal structure of a cartridge.

FIG. 3 shows a detailed structure of the cartridge 101 and the related structure of the cartridge holder 22. The cartridge 101 has a housing 101A and, disposed within this housing 101A, a first roll 103, a second roll 105, a ribbon supply roll 107, a ribbon take-up roller 108, and a tape feed roller 109. The first roll 103 is formed of a strip-like (elongated) base tape 102 wound into a roll. The second roll 105 is formed of a transparent elongated cover film 104 having the same width as the base tape 102. The second roll 105 is also wound into a roll. The ribbon supply roll 107 pays out an elongated ink ribbon 106. The ribbon take-up roller 108 takes up the ink ribbon 106 that has been used for printing. The tape feed roller 109 is rotatably supported near a tape discharge portion of the cartridge 101. Note that the ink ribbon 106 is unnecessary when the cover film 104 is a thermal tape that can produce a prescribed color when heated. Further, although depicted as concentric circles in the drawing for simplification, the first roll 103 and the second roll 105 are actually wound in a spiral shape.

More specifically, the first roll 103 includes a reel member 103A around which the base tape 102 is wound. The base tape 102 includes a bonding adhesive layer, a base layer, a mounting adhesive layer, and a release layer, for example. These layers are laminated sequentially from the inward-facing side of the base tape 102 forming the first roll 103 toward the opposite side. The second roll 105 similarly includes a reel member 105A around which the cover film 104 is wound. The tape feed roller 109 bonds the base tape 102 to the cover film 104 with pressure to form a print label tape 110 while conveying the same.

A ribbon take-up roller drive shaft 27 and a tape feed roller drive shaft 28 are disposed in the cartridge holder 22. The ribbon take-up roller drive shaft 27 is provided for taking up the portion of the ink ribbon 106 already used for printing in the cartridge 101. The tape feed roller drive shaft 28 is provided for conveying the print label tape 110 described above. A conveying roller motor (not shown) transmits a drive force to the ribbon take-up roller drive shaft 27 and the tape feed roller drive shaft 28 for driving the ribbon take-up roller 108 and the tape feed roller 109 to rotate in association with the ribbon take-up roller drive shaft 27 and the tape feed roller drive shaft 28. The cartridge holder 22 is also provided with a print head 29 that prints desired content on the cover film 104 as the cover film 104 is conveyed.

A fixed blade 25 and a movable blade 26 are provided along the conveying path of the print label tape 110 on the downstream side of the tape feed roller 109 and a pressure roller 24 in a conveyance direction. In cooperation with the fixed blade 25, the movable blade 26 cuts through the print label tape 110 in the thickness direction.

Outline of Label Printer Operations

In the label printer 2 having the above construction, the cover film 104 and the ink ribbon 106 become interposed between the print head 29 and a platen roller 30 opposing the print head 29 when the cartridge 101 is mounted in the cartridge holder 22. At the same time, the base tape 102 and cover film 104 become interposed between the tape feed roller 109 and a pressure roller 24 opposing the tape feed roller 109. When the ribbon take-up roller 108 and the tape feed roller 109 are driven to rotate in synchronization in the directions indicated in FIG. 3 by the respective arrows B and C, the pressure roller 24 and the platen roller 30 rotate. The base tape 102 is paid out from the first roll 103 and supplied to the tape feed roller 109. The cover film 104 is paid out from the second roll 105 while a print driving circuit (not shown) energizes a plurality of heating elements in the print head 29 to print an image on the cover film 104. The ribbon take-up roller drive shaft 27 drives the ribbon take-up roller 108 to take up ink ribbon 106 that was used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cartridge 101. The portion of the print label tape 110 conveyed out of the cartridge 101 is cut off through the cooperative operations of the fixed blade 25 and the movable blade 26, producing a print label L.

Editing Screen for a Composite Label and Data Conversion for Label Dataset

Each print label L created on the label printer 2 having the above construction has a background color and an object color determined by the colors of the base tape 102 and the ink ribbon 106 in the housing 101A of the cartridge 101 being used. Thus, a single print label L can express a maximum of two colors, with the tape color of the base tape 102 rendering the background color and the color of the ink ribbon 106 rendering the printing color of the object. However, when a second print label L having a transparent (clear) tape (no color) and an object printed in a printing color different from the above-described two colors of the cartridge 101 for the first print label L is overlaid on and bonded to the top surface of the first print label L, it is possible to create a print label L expressing three colors since the background color and printing color in the bottom layer can be seen through the second transparent print label L. The tape color of the base tape 102 is an example of a color of a medium.

In the present embodiment, a laminated label construct capable of expressing three or more colors by overlaying a plurality of print labels L in the thickness direction and bonding the print labels L in this way will be called a composite label. The user overlays a plurality of print labels L created by the label printer 2 based on their individual label dataset and bonds the labels together. Subsequently, the user can affix the labels in their bonded state to a desired object. Next, a sample display of an editing screen for editing such composite labels will be described with reference to FIG. 4.

Figure 4:
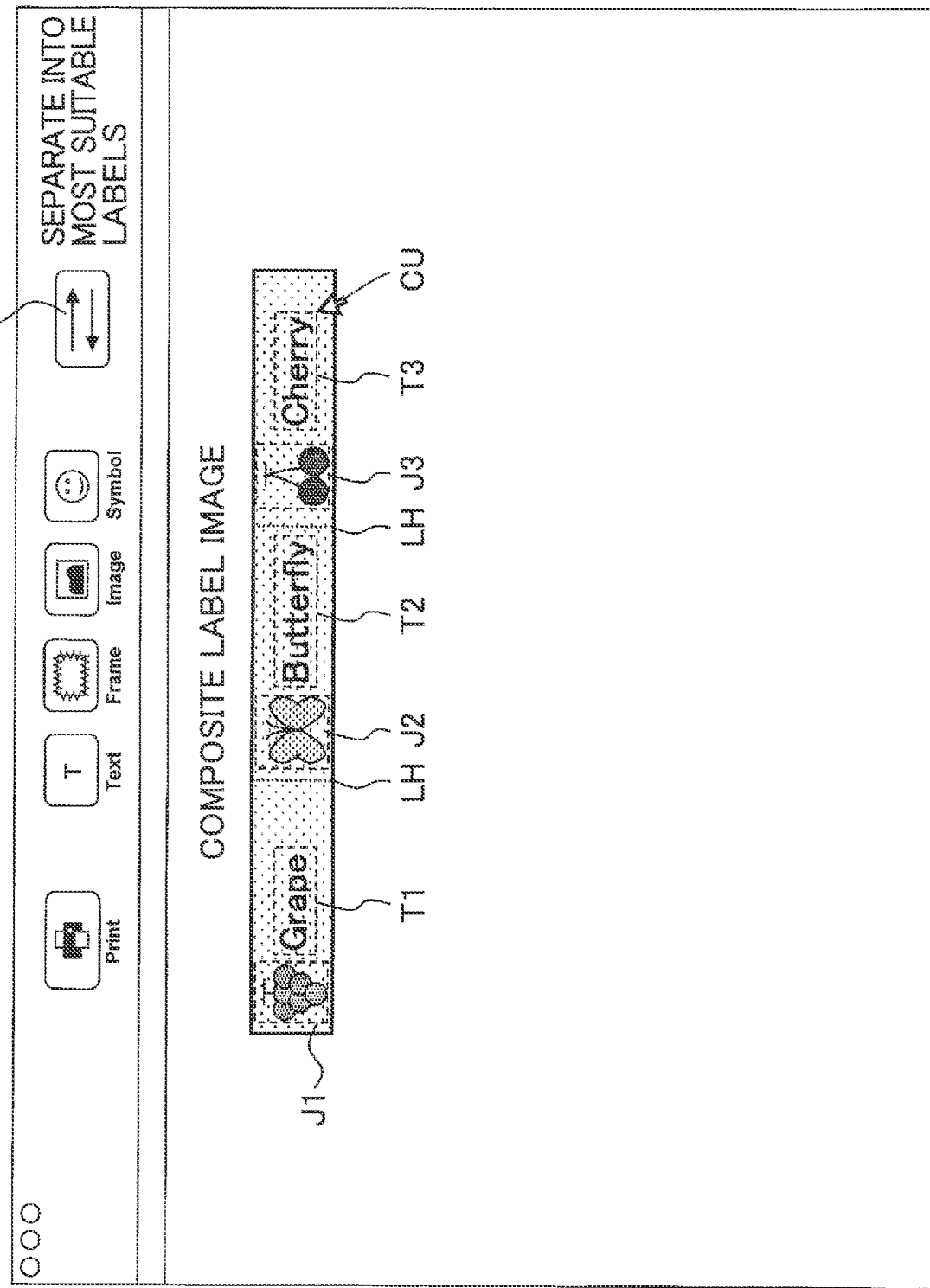
FIG. 4 is an explanatory diagram schematically illustrating an editing screen for aggregate dataset of a composite label displayed in the operation terminal.

FIG. 4 shows an example of a composite label editing screen displayed on the display 34 in the form of a graphical user interface (GUI) when the print data editing program is executed on the operation terminal 3. In the editing screen of the present embodiment, the user performs desired editing operations to directly edit the overall appearance image that will ultimately be rendered in the composite label indicated as "Composite label image" in FIG. 4.

In the sample composite label image shown in FIG. 4, three graphic objects J1, J2, and J3 depicting a grape, a butterfly, and cherries in order from left-to-right are arranged at regular intervals within a long narrow tape border (enclosing line) having a prescribed tape width. Text objects T1, T2, and T3 with the names "Grape," "Butterfly," and "Cherry" are arranged on the right sides of the corresponding graphic objects. The outlines of the graphic objects J1, J2, and J3 are borderlines depicted with the same black printing color, while the areas inside the borders are filled with a single printing color that differs for each graphic object. All of the text objects T1, T2, and T3 are set at the same black printing color and the same font (point size and style). Further, the background for the entire tape is set to a prescribed background color that differs from each of the printing colors described above.

In the present embodiment, half-cut lines LH within the tape border are arranged virtually in the label dataset at regular intervals of a prescribed length in the longitudinal direction. In the example of FIG. 4, two half-cut lines LH are arranged so as to divide the entire tape border region into three equal parts. With this configuration, a pair constituting one each of the graphic objects J1, J2, and J3 and the corresponding text object T1, T2, and T3 is accommodated in each of the trisected segments. The virtual half-cut lines LH are examples of marks.

When a user performs editing operations to edit the desired appearance image of the overall composite label, the print data editing program internally combines multiple object datasets and various parameters constituting the appearance image to generate a single aggregate dataset. However, since the composite label is configured by laminating a plurality of print labels L having different printing colors, a label dataset must be individually generated at least for each of the different printing colors in order to create the plurality of print labels L. The label dataset is an example of the print dataset.

Figure 5:
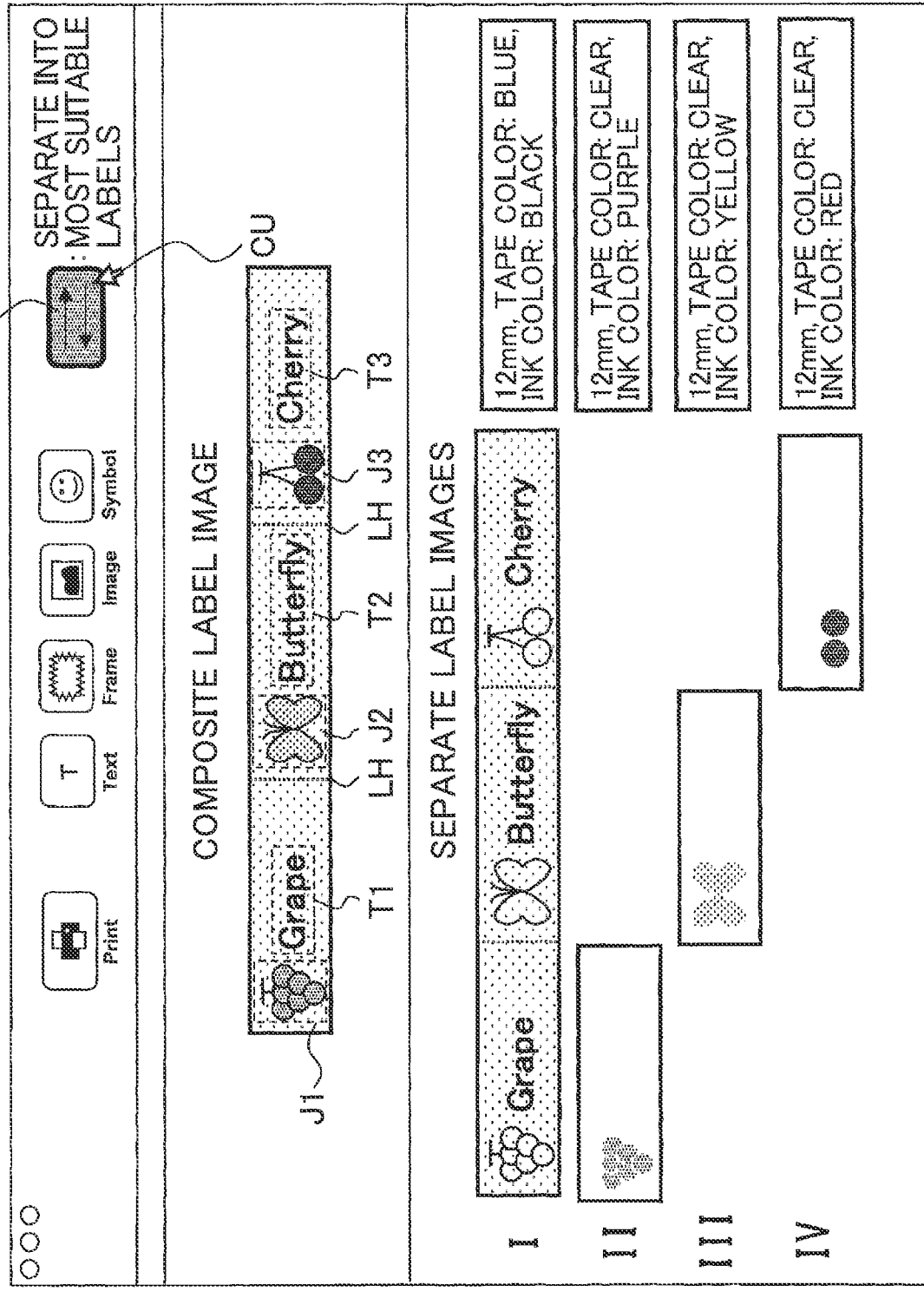
FIG. 5 is an explanatory diagram schematically illustrating an additionally-displayed summary screen of images of label datasets separated from the aggregate dataset according to a data conversion process.

Therefore, when editing the appearance image of the overall composite label, the user of the operation terminal 3 in the present embodiment moves a cursor CU over a Separate Labels button 51 shown in FIG. 4, for example, and presses the Separate Labels button 51 to execute a data conversion process for separating the single aggregate dataset described above into a plurality of label datasets. At this time, a summary screen (or list screen) is added to the bottom of the editing screen, as shown in FIG. 5. In this example, the summary screen is given the title "Separate label images" and includes a print image for the print label L corresponding to each separated label dataset.

In the example of FIG. 5, the single aggregate dataset corresponding to the edited composite label is separated into four label datasets through the data conversion process. The print images included in the summary screen include one image corresponding to the bottommost label forming the bottommost layer (label I at the top of the summary screen in FIG. 5), and three other images corresponding to upper-layer labels to be laminated onto the top surface of corresponding lower layer label beginning from the bottommost label (labels II-IV in FIG. 5). In this data conversion process, the aggregate dataset is separated into the most suitable label datasets in conformance with the separation conditions described below. The print image corresponding to the bottommost label is an example of a first print image, and the print image corresponding to the uppermost label is an example of a second print image.

First, due to the manner in which the composite label described above is constructed, the aggregate dataset is separated so that only the label dataset for the bottommost label expresses two different colors according to the colored tape and the printing color while the label dataset for each upper-layer label expresses a single color for printing an object with a single printing color. All tapes in the upper-layer labels are transparent. Next, the aggregate dataset is separated so that whenever possible all objects of the same printing color are combined in a single print label L. This is because it is preferable to minimize the number of print labels L constituting a single composite label. In other words, the aggregate dataset is separated into individual label datasets so that, for each of the upper layer labels other than the bottommost label, a label dataset expresses one of different colors.

Figure 6:
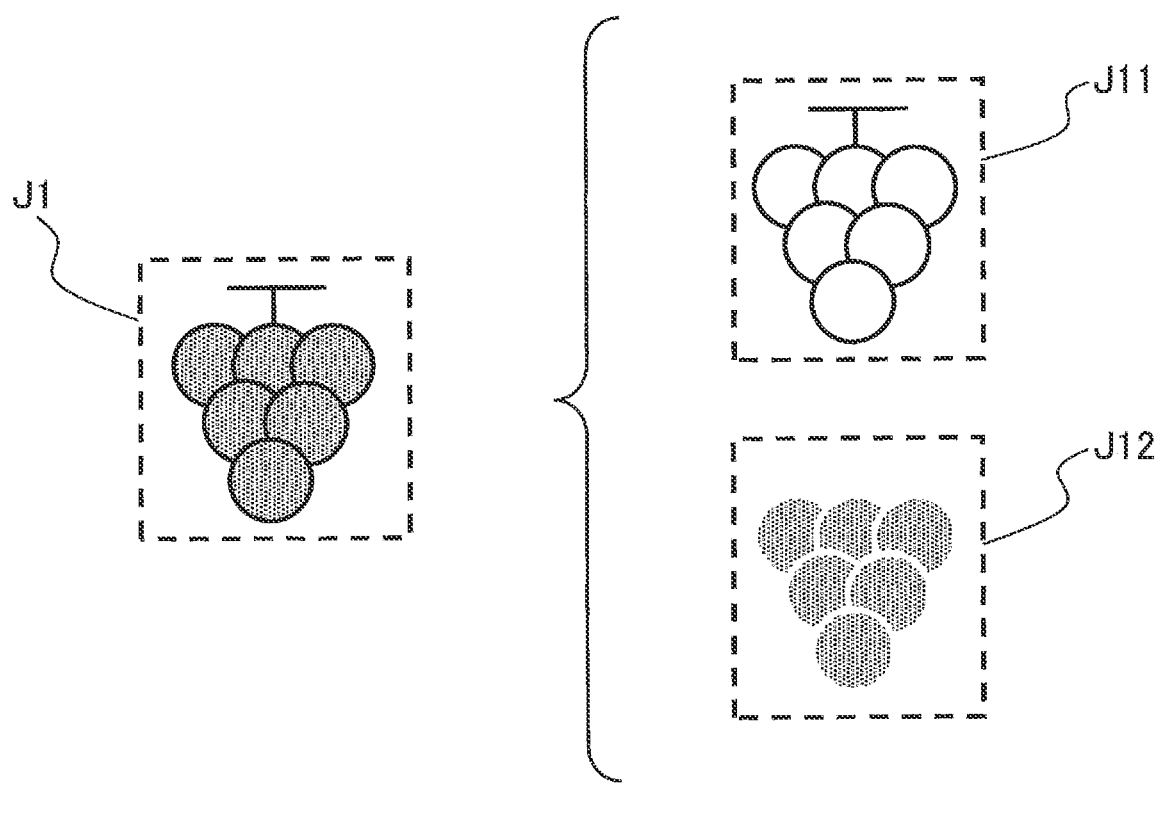
FIG. 6 is an explanatory diagram illustrating a relation between a compound object and object elements.

Further, when any of the object datasets included in the aggregate dataset represents a compound object that combines a plurality of object elements having different printing colors, a dataset for the compound object is broken down into label datasets corresponding to respective ones of the object elements. In other words, the label dataset for the compound object is separated by units of object elements. Specifically, as illustrated in the example of FIG. 6, the grape graphic object J1 includes an object element J11 representing black borders that depict the outline of the grape graphic, and an object element J12 representing a single non-black colored graphic filling the region inside the borders with a single color. Thus, image data for the graphic object J1 is divided so that the object elements J11 and J22 each representing a different single color are assigned to separate label datasets for different printing colors.

Further, the printing color having the highest dot occupancy ratio in the entire tape region, i.e., the printing color having the largest total area in the overall appearance image is set as the background color and is adopted as the tape color for the bottommost label. This method is used so that an object having the highest dot occupancy is not assigned to an upper-layer label to avoid the object from being arranged over an object in a lower layer. For the same reason, all objects having the printing color with the second highest dot occupancy rate, i.e., the printing color occupying the second largest total area in the overall appearance image (black in the example of FIG. 5) are sorted so as to be printed in that printing color in the bottommost label. The printing color having the largest total area is an example of a first color, and the printing color having the second largest total area is an example of a second color.

Here, each cartridge 101 that is mounted in the label printer 2 is configured to correspond uniquely as a unit to a cartridge dataset that includes the tape width, tape color, printing color, and the like. In other words, a type of the cartridge 101 is classified according to data such as the tape width, the tape color, and the printing color, for example. Therefore, the sets of tape colors and printing colors available for the bottommost label described above are necessarily limited by the configurations of the models of cartridges 101 actually manufactured and sold for the label printer 2. For this reason, in the present embodiment a cartridge management table is stored in the high-capacity storage 36 of the operation terminal 3 in advance. As illustrated in the example of FIG. 7, the cartridge management table stores cartridge datasets including such items as the tape width, tape color, and printing color for model numbers of cartridges 101 actually manufactured and sold. A label dataset for the bottommost label is then set so as to conform with cartridge dataset recorded in this cartridge management table. Therefore, the operation terminal 3 of the present embodiment first specifies a cartridge 101 compatible with the bottommost label, and subsequently specifies cartridges 101 compatible with the upper-layer labels. The item "Usage History" in the cartridge management table shown in FIG. 7 will be described later.

Further, in a case that the printing range of an object to be printed in an upper-layer label is relatively small, large blank areas are formed if the upper-layer label at the same tape length is created for the composite label. In this case, a large amount of the base tape 102 is wasted. Therefore, in the present embodiment, the overall tape length of the composite label is divided by the half-cut lines LH described above at regular intervals of a prescribed length, and a label dataset is corrected in order to shorten the tape length and eliminate segments in which no object is printed (see labels II-IV in FIG. 5). In a case that the length of a printing range of one or more objects for an upper-layer label is shorter than a prescribed length, the tape length of the upper-layer label is set shorter than the overall tape length of the composite label. The prescribed length may be a length obtained by subtracting the regular interval from the tape length of the composite label. The printing range of the object described above may be the region of dots forming the object when only a single object is included in the corresponding layer label or may be the overall region in which the objects are arranged when the objects are plural in the corresponding layer label. In this case, positional parameters for each object must be reset to convert positions in the overall tape length of the composite label to positions in the modified tape length, in order to rearrange the object relative to the label. In this way, the tape length for each upper-layer label is set so that: the tape length is one of one or more integer multiples of the prescribed interval between half-cut lines LH; and the tape length is the smallest multiple of the prescribed interval in which the printed object can be formed. The entire tape length of the composite label and a tape length of each upper layer label is an example of a printing length.

In the example shown in FIG. 5, a cartridge dataset for the cartridge 101 to be used for creating each of the print labels L is displayed to the right of the print image for the corresponding print label L. In this example, each cartridge dataset lists the tape width and tape color of the base tape 102 and the ink color of the ink ribbon 106 (i.e., the printing color). Here, the operation terminal 3 may also reference the cartridge management table to find the specific cartridge 101 having the cartridge dataset corresponding to each print label L, and may display the model numbers of these cartridges 101 (not shown in the drawings).

The cartridge 101 is an example of a print medium, the cartridge 10 for the bottommost layer label is an example of a first type of print medium, and the cartridge 101 for each upper-layer label is a second type of print medium. The label dataset for the bottommost layer label is first print data, and the label dataset for each upper layer label is second print data. The cartridge dataset for the bottommost layer label is first medium type information, and the cartridge data set for each upper layer label is a second medium type information.

Control Procedure

A sample control procedure executed by the CPU 31 of the operation terminal 3 to implement the above-described method of the present embodiment will be described with reference to the flowchart in FIG. 8. This control procedure includes the data conversion process described above and a printing process for printing each label dataset. The following procedure begins once the user has operated the Separate Labels button 51 in the editing screen of the print data editing program shown in FIG. 4.

In S5 the CPU 31 acquires one aggregate dataset corresponding to the appearance image of the composite label that the user edited in the editing screen (abbreviated to "edited label dataset" in the flowchart).

In S10 the CPU 31 counts the number of objects in the acquired aggregate dataset.

In S15 the CPU 31 acquires printing color information for each individual object.

In S20 the CPU 31 compares the printing color information for each object with the content (printing color) stored in the cartridge management table to specify model numbers of candidate cartridges that are compatible with each object.

In S25 the CPU 31 extracts the object whose printing color has the highest dot occupancy ratio. The CPU 31 specifies the candidate cartridges among those specified in S20 that are compatible with a bottommost label whose tape color matches the extracted printing color having the largest total area.

In S30 the CPU 31 determines whether any of the objects is a compound object. When there are no compound objects (S30: NO), the CPU 31 advances to S45.

However, when one or more compound objects are included in the objects (S30: YES), in S35 the CPU 31 separates each compound object into units of object elements having different printing colors for each of one or more compound objects. In S40 the CPU 31 adds the number of additional objects created by separating one or more compound objects to the number counted in S10, and subsequently advances to S45.

In S45 the CPU 31 generates a label dataset for the bottommost label so that the label dataset includes one or more objects having the same printing color as a printing color in one of candidate cartridges for the bottommost label. Specifically, the CPU 31 forms groups of one or more objects having the same printing color as each of the candidate cartridges for the bottommost label specified in S25. Next, the CPU 31 sets the one or more objects in the group having the highest total dot occupancy as the objects to be printed in the bottommost label and sets the corresponding printing color for the one or more objects as the printing color for the bottommost label. That is, the CPU 31 specifies the model number of the cartridge 101 suitable for the bottommost label based on the combination of the tape width, the tape color that is selected in S25, and the printing color that is selected in S45, and generates label dataset for the bottommost label in which all objects of the same printing color are arranged.

In S50 the CPU 31 specifies the cartridge 101 for an upper-layer label having a clear tape without color and a printing color matching one printing color of one or more remaining objects. Specifically, the CPU 31 forms a group of objects having the same printing color from among the remaining objects not included in the bottommost label. Next, the CPU 31 sets this group of objects to be printed in a single upper-layer label, and specifies the model number of the cartridge 101 having a combination of a clear tape and a printing color corresponding to this upper-layer label from among the candidate cartridges specified in S20.

In S55 the CPU 31 generates a label dataset for an upper-layer label. When the length of a printing range of the text object is shorter than the prescribed length, the CPU 31 adjusts the tape length to correspond to the printing range based on the group of objects, rearranges each object as described above, and generates the label dataset for an upper-layer label.

In S60 the CPU 31 determines whether all objects have been arranged in a label dataset. While there remain objects that have not been allocated to any label dataset (S60: NO), the CPU 31 returns to S50.

When all objects have been allocated to label datasets (S60: YES), the CPU 31 advances to S65.

In S65 the CPU 31 adds a summary screen beneath the editing screen on the display 34. The summary screen lists the cartridge dataset in association with the print image for each print label L represented by the label dataset.

In S70 the CPU 31 transmits each label dataset to the label printer 2 and issues a command to print the transmitted label dataset. Here, a separate Print button (not shown) may be displayed, and the user may issue the print command by operating this Print button. This completes the process in FIG. 8.

All the steps of the flowchart described above is an example of a print control program. The process of S5 is an example of an image acquisition process or step. The process of S15 is an example of a color identification process or step. The processes of S25 and S50 are an example of a medium specification process or step. The processes of S45 and S55 is an example of a data generating process or step. The process of S70 is an example of a print process or step. The process of S25 is a first color identification process. The process of S50 is an example of a second color identification process. The process of S55 is a setting process. The process of S65 is a display process.

Effects of the Present Embodiment

Figure 8:
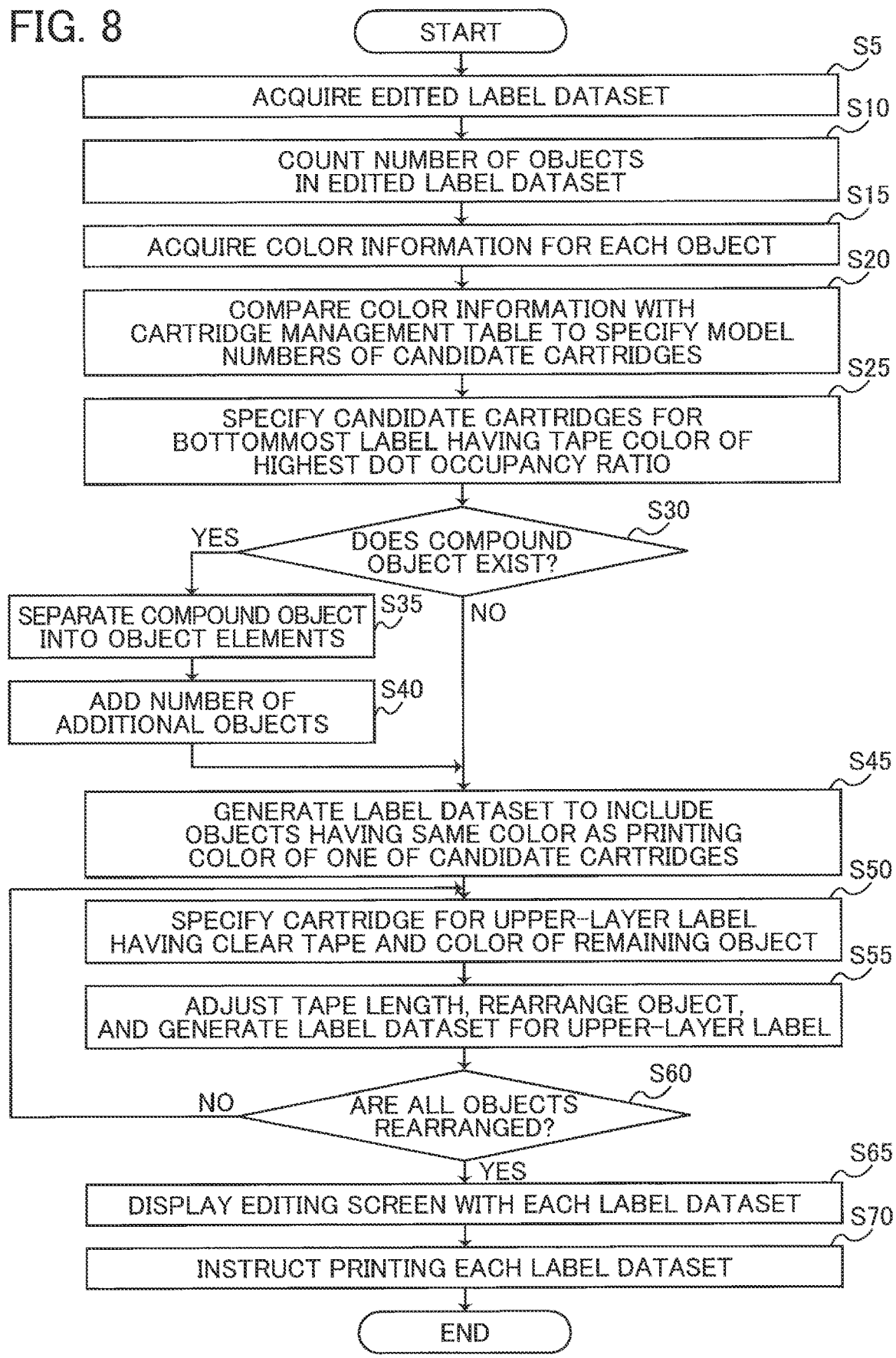
FIG. 8 is a flowchart illustrating a control procedure including the data conversion process executed by a CPU of the operation terminal.

As described above, the print data editing program (print control program) implementing the process shown in FIG. 8 for the present embodiment generates a plurality of label datasets from an appearance image including a plurality of colors and prints each label dataset using a different cartridge 101. Accordingly, the print data editing program can simplify the creation of a print label L for each layer by printing the plurality of label datasets.

Based on the print data editing program (print control program) of the present embodiment, the CPU 31 of the operation terminal 3 executes each of the steps S5, S15, S25 and S50, S45 and S55, and S70. In the process of S5 the CPU 31 acquires an aggregate dataset representing the appearance of a single composite label in response to user input, for example. The aggregate dataset includes a plurality of objects representing an appearance image having a plurality of colors. In S15 the CPU 31 identifies each of the colors in the acquired aggregate dataset. Based on the identification results for each of the colors, in S25 and S50 the CPU 31 specifies the model number for each of the corresponding cartridges 101. In S45 and S55 the CPU 31 generates label datasets corresponding to the specified model numbers of the plurality of cartridges 101. In S70 the CPU 31 uses the base tapes 102 and the cover films 104 in the cartridges 101 having the model numbers specified in S25 and S50 to print the plurality of label datasets.

As described above, when the user inputs an appearance image whose label is to be generated by bonding a plurality of print labels L, the operation terminal 3 of the present embodiment automatically selects a plurality of cartridges 101 capable of rendering this appearance. By generating a label dataset for each of the plurality of cartridges 101, the operation terminal 3 automatically sets what objects are to be printed using what cartridges 101. With the present embodiment, a user can easily create a print label L for each layer needed to produce a composite label having the desired appearance.

One feature of the present embodiment is that the tape color for the cartridge 101 is set to a transparent color (the tape color is set to no color, or the tape is clear) for upper-layer labels in step S50. By setting the tape color to a transparent color in this way, the operation terminal 3 can prevent the upper-layer label from covering up and obscuring the appearance rendered by print labels L in lower layers.

Another feature of the present embodiment is that the operation terminal 3 specifies the cartridge 101 for the bottommost label prior to specifying cartridges 101 for upper-layer labels from among the plurality of cartridges 101 based on identification results in step S15. Specifying the cartridge 101 for the bottommost label prior to specifying cartridges 101 with a transparent tape color (a clear tape) facilitates the process of specifying each cartridge 101.

Another feature of the present embodiment is that the CPU 31 executes step S25 for identifying the printing color among the colors identified in S15 having the largest total area in the appearance image of the overall composite label. Further, in S25 the CPU 31 identifies the printing color and specifies the cartridge 101 having a tape color equivalent to the identified printing color to be used for creating the print label L that will form the bottommost layer label.

In this way, the color among the plurality of colors identified in step S15 having the largest total area in the appearance image is set to the tape color, and a cartridge 101 having that tape color is specified as the cartridge 101 to be used for the bottommost layer label. By specifying this cartridge 101, the operation terminal 3 can avoid appearances rendered in upper-layer print labels L from covering up and obscuring appearances rendered in lower-layer print labels L.

Another feature of the present embodiment is that the CPU 31 executes the process of S50 for identifying a printing color among the plurality of colors identified in step S15 that differs from the tape color and printing color of the cartridge 101 for the bottommost label. Further, in S50 the CPU 31 specifies the cartridge 101 for an upper-layer label having a printing color matching the identified printing color. In this way, the operation terminal 3 specifies the cartridge 101 for an upper-layer label having a printing color among the plurality of colors identified in S15 that differs from the printing colors that can be expressed by the cartridge 101 for the bottommost label, thereby facilitating the specification of cartridges 101.

As another feature of the present embodiment, in steps S45 and S55 the CPU 31 sets the tape lengths (the printing lengths) for print labels L in layers above the bottommost label less than or equal to the tape length (the printing length) for the print label L constituting the bottommost layer. By not setting the length of upper-layer labels to exceed the length of the bottommost label, the plurality of print labels L can be more easily superimposed and bonded together.

Another feature of the present embodiment is that the base tape 102 and the cover film 104 are long strip-like media extending in a length direction and having a width in a width direction. When a plurality of half-cut lines LH representing borders is included at prescribed intervals in the appearance image, the CPU 31 executes step S55 for setting the tape length (the printing length) corresponding to an upper-layer print label L so that: the tape length (the printing length) is one of one or more integer multiples of the prescribed interval between half-cut lines LH; and the tape length (the printing length) is the smallest multiple of the prescribed interval in which the objects represented by the label dataset can be formed.

Accordingly, when the appearance of the composite label includes a plurality of pages and the appearance image includes half-cut lines LH representing borders between neighboring pages, the CPU 31 performs the process in S55 to create print labels L constituting upper layers in the composite label. In this process, the CPU 31 sets the tape length of the base tape 102 for creating the upper-layer print label L to a length based on the prescribed interval between these borders. Specifically, the CPU 31 sets the tape length so that the tape length is N times the prescribed interval (where N is an integer of 1 or greater) and the tape length is to a length equivalent to the smallest multiple of the prescribed interval in which objects represented by the label dataset can be formed. For example, when a plurality of pages of a composite label is obtained by cutting along the borders described above and upper-layer print labels L created in common for these pages include unnecessary parts in certain pages, those parts are not considered in the necessary length and are not created. Thus, the present embodiment can prevent the generation of unnecessary blank regions when creating upper-layer print labels L.

Note that the tape length of the base tape 102 for creating an upper-layer label is not limited to units of the prescribed interval between the half-cut lines LH described above, provided that the minimum tape length need for printing the objects in the upper-layer label is allocated.

Another feature of the present embodiment is that the CPU 31 executes step S65 for displaying cartridge datasets representing the cartridge 101 for the bottommost label and the cartridges 101 for the upper-layer labels specified in steps S25 and S50. Each of the cartridge datasets is displayed on the display 34 of the operation terminal 3 in association with one of a label image represented by a label dataset for the bottommost label and label images represented by label datasets for the upper-layer labels that were generated in steps S45 and S55.

Thus, by setting what objects to print on what tapes of cartridges 101 based on an inputted image as described above, a cartridge dataset representing each cartridge 101 can be displayed on the display 34 with the corresponding label image. According to this embodiment, the user can easily understand and recognize what types of print labels L can produce a composite label having the user's desired appearance.

In addition to commonly used types of cartridges 101, types of cartridges 101 may include special types that use a glossy base tape 102 than the normal type and special types that use a decorative base tape 102 containing glitter or other lavish decorations (not shown in the drawings). In this case, the model numbers of cartridges 101 are pre-classified as normal types or special types in the cartridge management table. The user is prompted to select which type of cartridge 101 to give priority for use as the bottommost label (to select type information), and the CPU 31 acquires or receives the selected type information, and in S25 specifies the candidate cartridges while prioritizing the acquired type. The normal type cartridge 101 is an example of a medium type classified into a first type group, and the special type cartridge 101 is an example a medium type classified into a second type group. The type information that the user selects is an example of settings information. The process to receive the user selection (the type information) is an example of the settings acquisition process.

In this way, the operation terminal 3 can set cartridges 101 that have priority for use. For example, the operation terminal 3 may be provided with a priority mode for giving priority to the use of special tapes such as glossy tape or decorative tape over normal tape. Accordingly, the operation terminal 3 can create a composite label while giving priority to glossy tape or decorative tape according to the user's application, purpose, or preference.

(Second Embodiment) Modifying the Display Mode for Cartridge Datasets Based on Usage History In step S65 of the first embodiment described above, the operation terminal 3 lists the label images and cartridge datasets for all the print labels L on the display in the same style, as illustrated in FIG. 5. However, many model numbers (product types) of commercially available cartridges 101 may be prepared for each set of detailed specifications that include a tape width, a tape color, and a printing color. In such cases, the cartridge datasets listed on the display normally includes one or more cartridges 101 of model numbers that the user does not currently possess.

Figure 9:
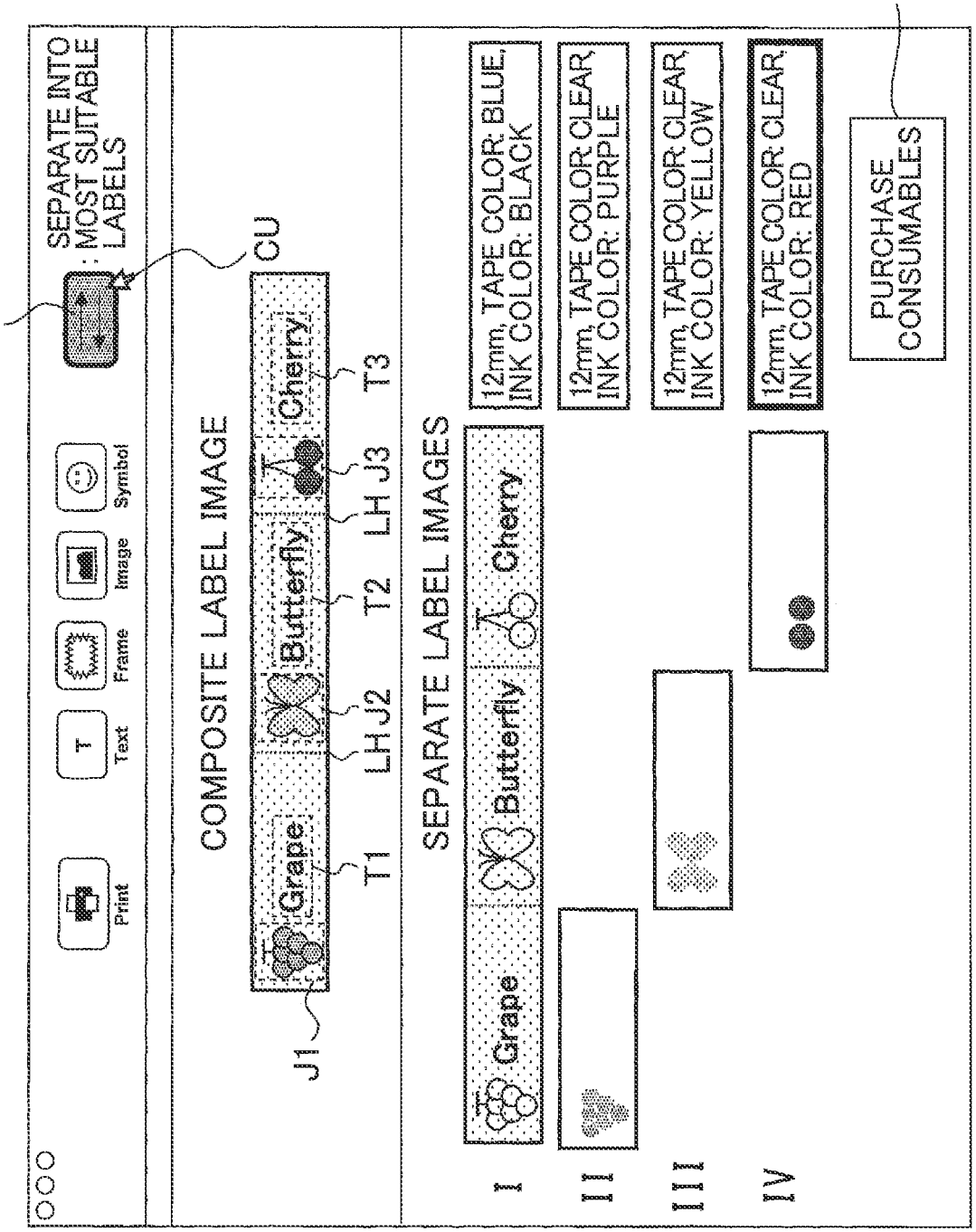
FIG. 9 is an explanatory diagram schematically illustrating display of cartridge datasets whose display styles depending on usage histories.

Therefore, when a cartridge 101 of a model number that has not yet been actually used on the label printer 2 of the user, the operation terminal 3 of the second embodiment considers that the user likely does not currently possess that cartridge 101. Consequently, since the user must purchase a new cartridge 101 of this model number, the operation terminal 3 redisplays the relevant cartridge dataset of the model in a more emphasized style than datasets for models of cartridges 101 used in the label printer 2, as illustrated in FIG. 9. In the example shown in FIG. 9, the text and borderlines for the cartridge dataset corresponding to the label image IV are displayed in bold. The operation terminal 3 also adds a Purchase Consumables button 52 to the display for directing the user to a website at which the cartridge 101 can be purchased.

For this reason, the cartridge management table shown in FIG. 7 is also stored in the high-capacity storage 42 of the label printer 2 in the second embodiment. The usage history for each of model numbers of cartridges 101 that were used at least once in the past in the label printer 2 is recorded so as to be correlated with the model number in this cartridge management table. In other words, when a cartridge of a model number is once used in the label printer 2, the usage history is included in the cartridge dataset having the model number. The usage history indicates that a cartridge of a model number was once used in the label printer 2 in the usage history. In other words, the cartridge dataset not including the usage history indicates that a cartridge of the model number has not been used in the label printer 2. The operation terminal 3 then acquires information on this usage history from the label printer 2 and, after specifying whether the cartridge dataset for each generated print label L has the usage history, highlights each cartridge dataset without the usage history, and determines whether to display the Purchase Consumables button 52.

A sample control procedure executed by the CPU 31 to implement the above-described method of the second embodiment will be described with reference to the flowchart in FIG. 10. This control procedure begins after completing the execution of step S65 (and prior to executing step S70) in the flowchart of FIG. 8 described above.

Figure 10:
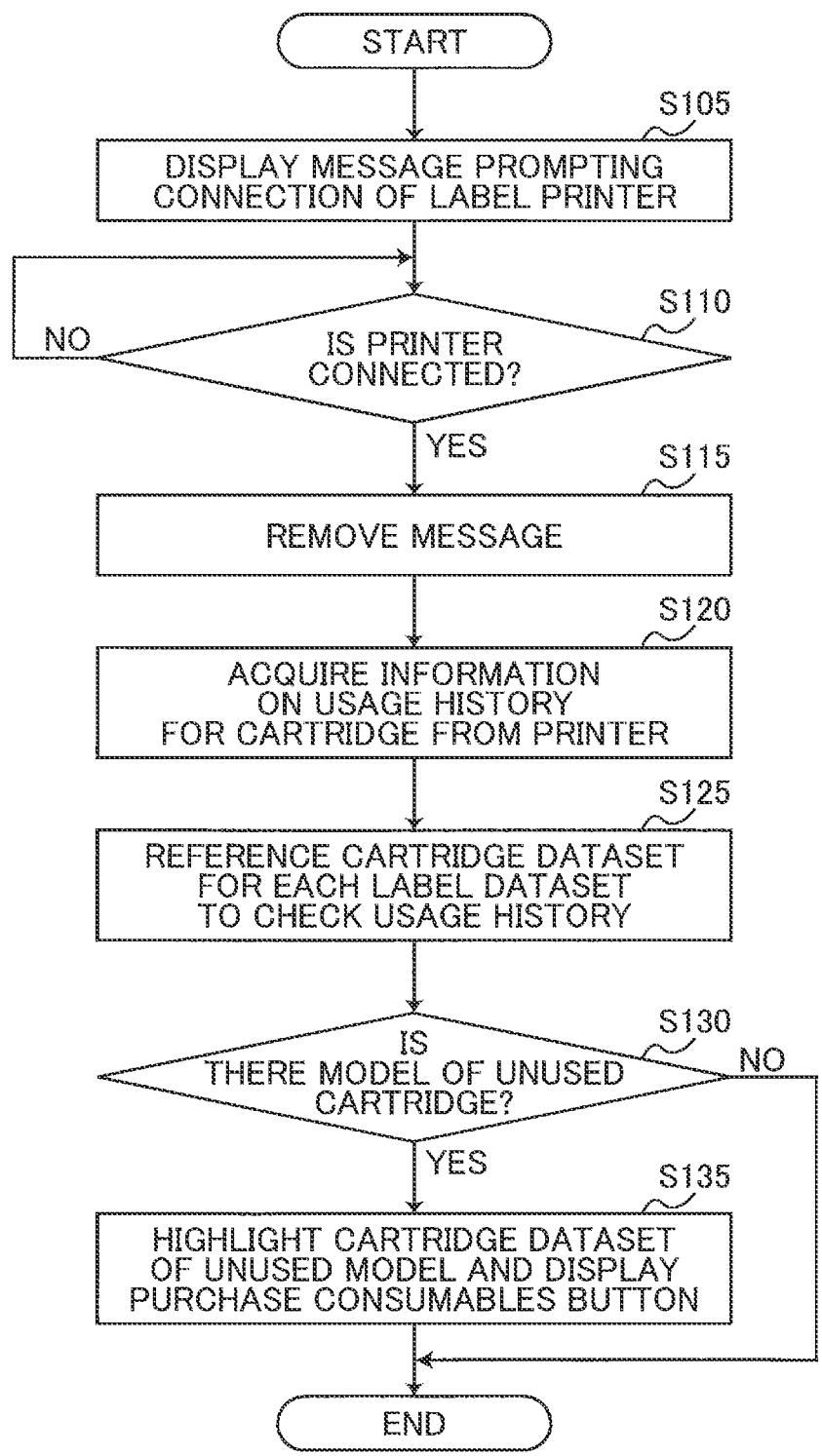
FIG. 10 is a flowchart illustrating a control procedure including a data conversion process executed by the CPU of the operation terminal.

In S105 at the beginning of FIG. 10, the CPU 31 displays on the display 34 a message prompting the user to connect the label printer 2 to the operation terminal 3.

In S110 the CPU 31 waits in a loop while determining whether the label printer 2 has been connected to the operation terminal 3 (S110: NO). Once a connection has been established (S110: YES), the CPU 31 advances to S115.

In S115 the CPU 31 removes the message that was displayed in S105.

In S120 the CPU 31 acquires information on the usage history for each cartridge model number from the cartridge management table stored on the label printer 2 and updates the cartridge management table in the operation terminal 3 to be the same as the cartridge management table stored on the label printer 2. For example, when a usage history has been added to a cartridge dataset of a certain model number in the cartridge management table in the label printer 2, the CPU 31 updates the cartridge management table in the operation terminal 3 so that a cartridge dataset of this certain model number has the usage history.

In S125 the CPU 31 references the updated information on usage history in the cartridge management table in the operation terminal 3, and determines whether the cartridge dataset for each of the currently generated label datasets having the usage history to determine whether a cartridge of the model specified by the cartridge dataset has been used in the past.

In S130 the CPU 31 determines whether one or more cartridge model numbers in the cartridge datasets do not have the usage history, i.e., there is any model of the cartridge which is unused in the label printer 2. When each model of the cartridge is used in the label printer 2 (S130: NO), the process in FIG. 10 ends.

However, when even one model of a cartridge is unused in the label printer 2 (S130: YES), the CPU 31 advances to S135.

In S135 the CPU 31 redisplays a cartridge dataset corresponding to each model number of the cartridge unused in the label printer 2 so that the cartridge dataset without the usage history is highlighted. The CPU 31 also adds the Purchase Consumables button 52 to the display. Subsequently, the process in FIG. 10 ends, and the CPU 31 advances to S70 in FIG. 8.

The process of S120 is an example of a history acquisition process. The process of S135 is an example of a display process.

As described above, in step S135 of the second embodiment, cartridge datasets for cartridges 101 having past usage history are displayed in a different format from cartridge datasets for cartridges 101 having no past usage history. Through this process, cartridges 101 having no past usage history are displayed in a style different from cartridges 101 having usage history. According to this embodiment, the user can reliably recognize when types of cartridges 101 that have not been used in the past are required for producing the desired appearance of the composite label.

In the second embodiment, the operation terminal 3 is an information processing device that transmits a plurality of label datasets to the label printer 2 in step S70 directing the label printer 2 to print the label datasets. Further, the CPU 31 provided in the operation terminal 3 is directed to execute step S120 for acquiring the usage history for each model number of cartridges 101 from the label printer 2. According to the second embodiment, the operation terminal 3 is configured to transmit label datasets to the label printer 2 for printing. Further, by executing step S120 the CPU 31 of the operation terminal 3 can acquire usage history for each cartridge 101 from the label printer 2.

Figure 11A:
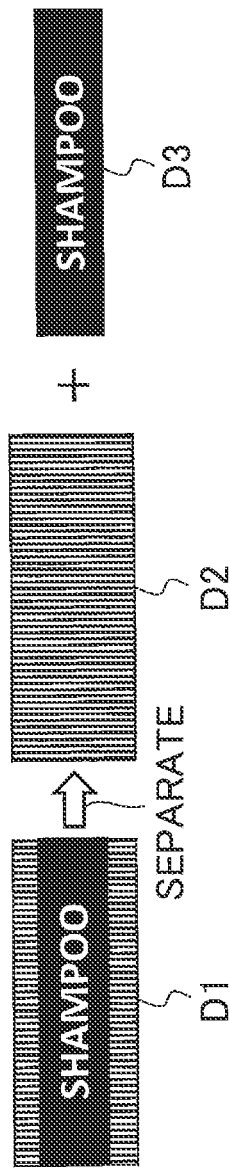
FIG. 11A is an explanatory diagram illustrating label datasets when a partial lamination setting for a text object is enabled.
Figure 11B:
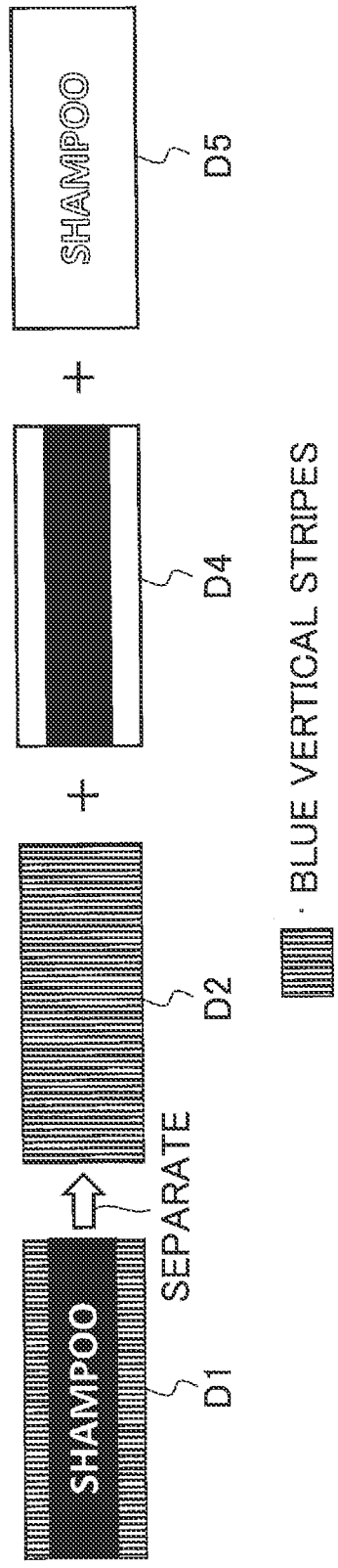
FIG. 11B is an explanatory diagram illustrating label datasets when the partial lamination setting for the text object is disabled.

(Third Embodiment) Configurable Settings for Enabling Partial Lamination and Image Conservation The left sides of FIGS. 11A and 11B show examples of editing an appearance image dataset D1 for a composite label. The appearance image dataset D1 in this example is represented by text, a black background, and a background with blue vertical stripes. The text includes the character string "SHAMPOO" in a white printing color and is centrally positioned on the composite label. The black background extends across the entire composite label in the tape length direction, overlapping all of the text. The blue striped background is arranged outside the black background on both sides in the tape width direction.

In a data conversion process for generating a plurality of label datasets from this appearance image dataset D1, the appearance image dataset D1 is converted to label datasets D2 and D3 for two print labels L, as shown in FIG. 11A, when priority has been given to minimizing the number of print labels L being created. In other words, the appearance image dataset D1 is separated into the label dataset D2 for the bottommost label and the label dataset D3 for an upper-layer label. The label dataset D2 is for printing vertical stripes in a blue printing color across an entire tape that is white in color and has the same tape length and width as the composite label. The label dataset D3 is for printing a text object in a white printing color in the center of a tape that is entirely black and has the same tape length as but a narrower tape width than the composite label. In this case, the upper-layer label has a black tape color and a white printing color, and the upper-layer label having a narrow tape width must be attached to and laminated on a portion of the surface on the bottommost label having a wide tape width. Hereinafter, bonding an upper-layer print label L having a narrow tape width to a portion of the surface on a lower-layer print label L with a wide tape width will be called "partial lamination," and a setting to enable the creation of label datasets D2 and D3 for a plurality of print labels L having such a relationship will be called a "setting for enabling partial lamination" or "partial lamination setting being enabled."

However, when the creation of such print labels L having different tape widths is not allowed, i.e., when the setting for allowing partial lamination has not been enabled, the appearance image dataset D1 must be converted to label datasets D2, D4, and D5 for three print labels L, as illustrated in FIG. 11B. Specifically, all of the label datasets represent shapes having the same tape length and tape width as the composite label, and the appearance image dataset D1 is separated into the label dataset D2 for the bottommost label, a label dataset D4 for the middle label, and a label dataset D5 for the uppermost label. The label dataset D2 is for printing vertical stripes in a blue printing color across an entire tape that is white in color. The label dataset D4 is for printing a solid band-like object that is narrower than the tape width of the composite label in a black printing color on a transparent tape. The label dataset D5 is for printing a text object in a white printing color centrally positioned on a transparent tape. In this way, the number and content of generated label datasets differs according to whether the partial lamination setting has been enabled. The cartridge 101 corresponding to the meddle label is an example of a forth type printing medium.

Figure 12:
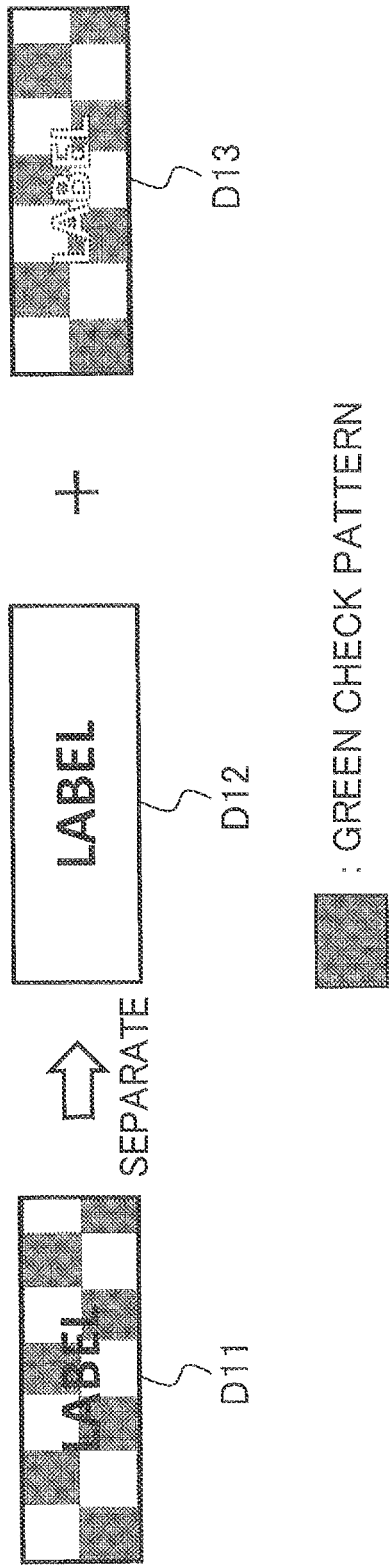
FIG. 12 is an explanatory diagram illustrating label datasets when an image conservation setting is enabled.

In the example shown on the left side of FIG. 12, an appearance image dataset D11 for a composite label has been edited. The appearance image dataset D11 in this example represents a background and text. The background has a green and white check pattern (a checkerboard pattern) across the entire composite label. The text includes the character string "LABEL" in a black printing color centrally positioned on the label.

In a data conversion process for generating label datasets D12 and D13 from this appearance image dataset D11, the bottommost label may be set to a white tape color and a black printing color, i.e., the text object arranged on the top in the appearance image may be selected to be printed on the bottommost label. In this case, the check pattern object is printed in a green printing color on a transparent tape for the upper-layer label. However, areas of the check pattern matching the printing pattern of the text object must be blanked out when printing the check pattern. In the following description, a setting for printing an upper-layer object with blank areas to prevent the object from overlapping a text object printed in a lower layer will be called an "image conservation setting for the text object."

A sample control procedure performed for implementing the data conversion process according to the third embodiment will be described with reference to the flowchart in FIG. 13 wherein like steps are designated with the same reference numerals to avoid duplicating description. Here, it is assumed that the user selected an option to enable or disable the partial lamination setting described above prior to executing the data conversion process.

Figure 13:
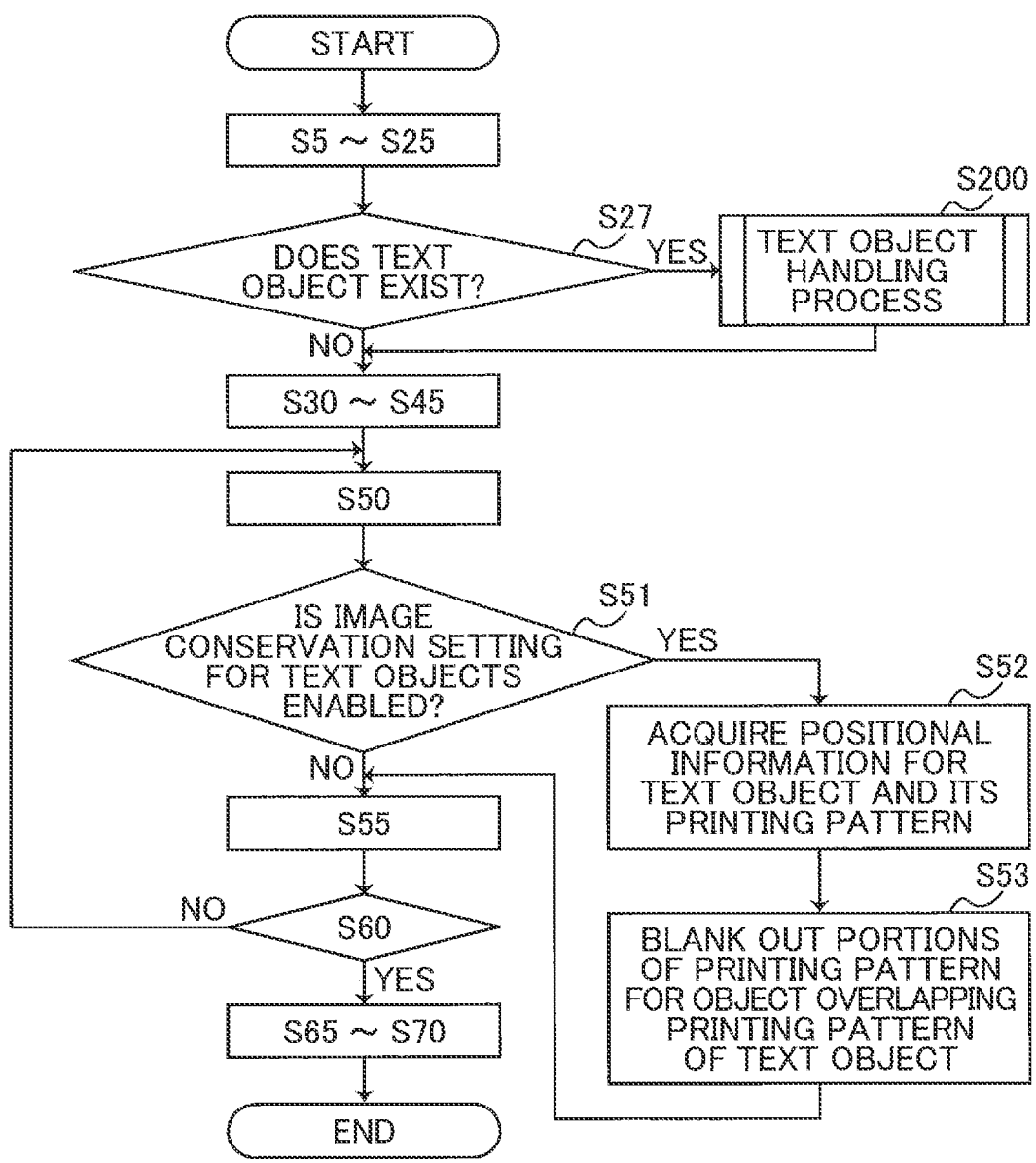
FIG. 13 is a flowchart illustrating a control procedure including a data conversion process in which the partial lamination the image conservation is executed.

A description of steps S5-S25 at the beginning of the process in FIG. 13 is omitted since these step numbers are identical to those in the embodiments described above. After completing step S25, in S27 the CPU 31 determines whether the aggregate dataset includes any text objects. When the aggregate dataset does not include text objects (S27: NO), the CPU 31 advances to S30.

However, when a text object is included in the aggregate dataset (S27: YES), the CPU 31 executes a text object handling process in S200 (described later with reference to FIG. 14) and subsequently advances to S30.

A description of steps S30-S50 is omitted since the steps are identical to those in the embodiments described above. After completing step S50 (and prior to executing step S55), the CPU 31 advances to S51.

In S51 the CPU 31 determines whether the image conservation setting for text objects was enabled in the text object handling process of S200 described later. When the image conservation setting was not enabled (S51: NO), the CPU 31 advances to S55.

However, when the image conservation setting for text objects has been enabled (S51: YES), the CPU 31 advances to S52.

In S52 the CPU 31 acquires positional information for each text object and its printing pattern.

In S53 the CPU 31 performs a masking process or the like to blank out portions of the printing pattern for the object (the green check pattern object in this example) overlapping the printing pattern of each acquired text object from above. Subsequently, the CPU 31 advances to S55.

A description of steps S55-S70 is omitted since these steps are identical to those in the embodiments described above. After step S70 is performed, the process in FIG. 13 ends.

Figure 14:
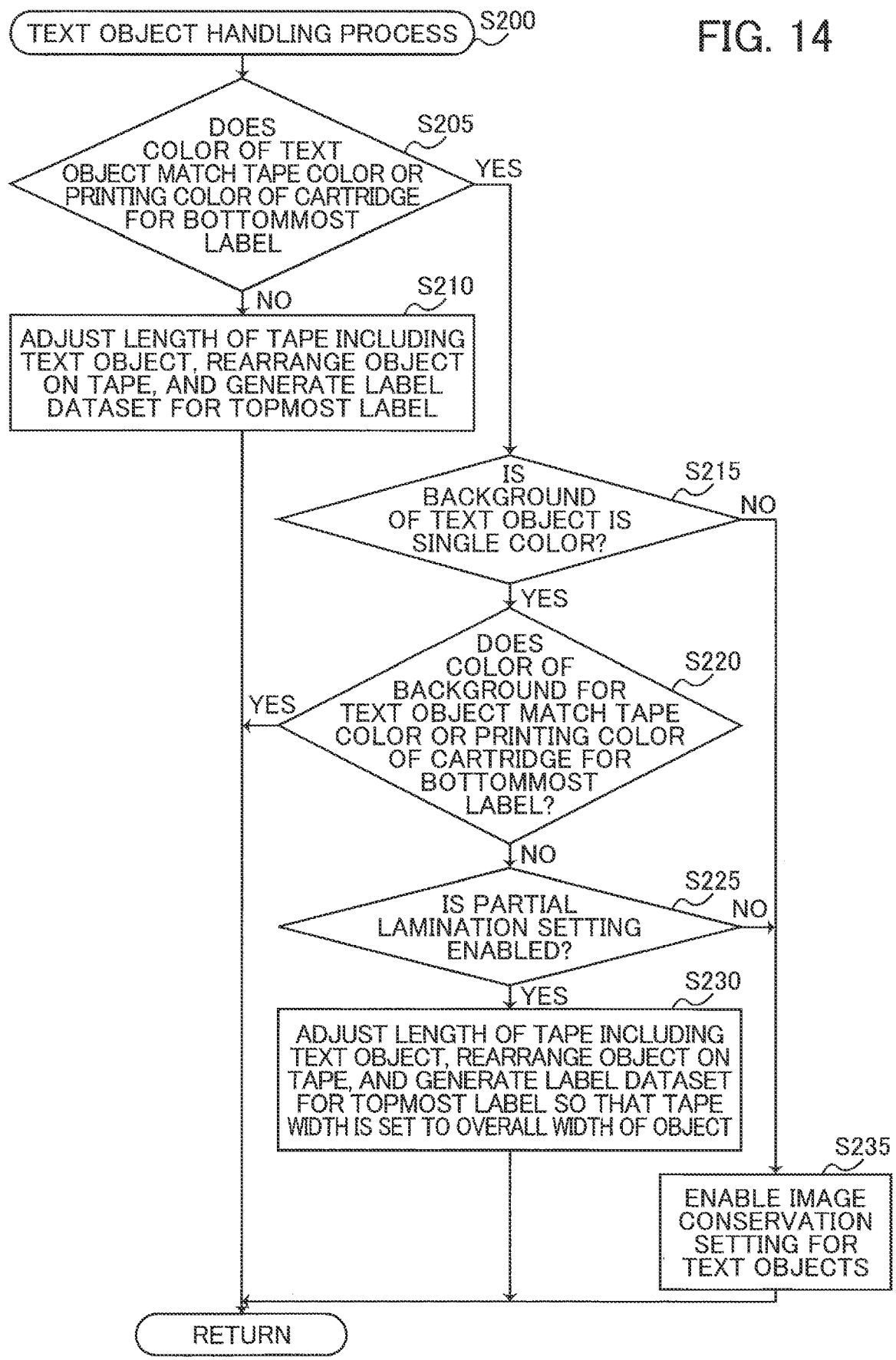
FIG. 14 is a flowchart illustrating a text object handling process.

Next, a sample control procedure for the text object handling process in S200 described above will be described with reference to the flowchart in FIG. 14.

In S205 the CPU 31 determines whether the printing color of the text object matches one of the tape color and printing color of one of candidate cartridges for the bottommost label. In S205 the CPU 31 makes this determination above for each of the candidate cartridges to find one or more cartridges satisfying the determination condition of S205. In S205 the CPU 31 may only determine whether the printing color of the text object matches the printing color of one of candidate cartridges for the bottommost label. When the printing color of the text object does not match at least one of the colors in the cartridge candidates, that is, there is at least one cartridge candidate whose colors are different from the color of the text object (S205: NO), the CPU 31 advances to S210. In this case, since the printing color of the text object matches neither the tape color nor printing color of at least one of the cartridge candidates, the text object can be printed by using a cartridge other than the candidate cartridges for the bottommost label, and thus the text object is excluded as a candidate for the object to be printed as the bottommost label.

In S210 the CPU 31 generates a label dataset for the topmost label including the text object. When the length of a printing range of the text object is shorter than the prescribed length, the CPU 31 adjusts the length of the tape for the text object, and generates the label dataset for the topmost label including the text object so that the text object is rearranged. In other words, the CPU 31 specifies the model number of the cartridge 101 having a clear tape and having the printing color the same as that of the text object to be used for creating the topmost label. This ends the process in FIG. 14.

However, when the printing color of the text object matches one of the colors in a candidate cartridge for all of the candidate cartridges for the bottommost label (S205: YES), the CPU 31 advances to S215.

In S215 the CPU 31 determines whether the background of the text object is set to a single color. When the background of the text object is a single color (S215: YES), the CPU 31 advances to S220.

In S220 the CPU 31 determines whether the color of the background for the text object matches the tape color or printing color of any of the cartridge candidates for the bottommost label. In S220 the CPU 31 may only determine whether the color of the background for the text object matches the tape color of any of the cartridge candidates for the bottommost label which are used for determining to satisfy the determination condition of S205. When the background color matches the tape color or printing color in the bottommost label (S220: YES), the process in FIG. 14 ends. In this case (S205: YES and S220: YES), the combination of the printing color and background color of the text object matches the combination of the printing color and tape color of one of the cartridge candidates. Thus, the text object is still included in the candidates for the object to be printed in the bottommost label. In this case, when the text object is determined to be printed in the bottommost label, in S45 the CPU 31 generates a label dataset for the bottommost label in which the text object is to be arranged. Alternatively, in the case that YES determinations are made in both S205 and S220, in S45 the CPU 31 may set that the text object is the object to be printed in the bottommost label without considering the total dot occupancies of the objects, and generates the label dataset for the bottommost label in which the text object is to be arranged.

However, when the background color of the text object matches neither the printing color nor tape color of any cartridge candidates for the bottommost label (S220: NO), the CPU 31 advances to S225.

In S225 the CPU 31 determines whether the user previously enabled the partial lamination setting. When the partial lamination setting has been enabled (S225: YES), the CPU 31 advances to S230.

In S230 the CPU 31 generates a label dataset for the topmost label including the text object so that the cartridge to be used for printing this label dataset has the tape width setting matching the overall width of the object or a minimum and selectable width that can include the object. When the length of a printing range of the text object is shorter than the prescribed length, the CPU 31 adjusts the length of tape for the text object, rearranges the object on the tape, and generates the label dataset for the topmost label including the text object. In other words, the CPU 31 specifies the model number of the cartridge 101 to be used for creating the topmost label so that the cartridge 101 has the combination of the tape color and the printing color the same as the combination of the background color and the printing color of the text object, and the tape width matching a width designated by the label dataset.

However, when the background of the text object is not set to a single color (S215: NO) or when the partial lamination setting was not enabled (S225: NO), the CPU 31 advances to S235.

In S235 the CPU 31 enables the image conservation setting for text objects, and subsequently ends the process in FIG. 14. In this case, in S45 the CPU 31 may set that the text object is the object to be printed in the bottommost label without considering the total dot occupancies of the objects, and generates the label dataset for the bottommost label in which the text object is to be arranged.

The process of S205 is an example of a first determination process. The process of S210 is an example of a medium specifying process and medium specifying process means. The cartridge 101 specified in S210 is an example of a third printing medium type. The process of S215 is an example of a second determination process. The printing pattern of the text object is an example of a region corresponding to the text object. The process of S220 is an example of a third determination process.

In the third embodiment described above, the CPU 31 is directed to execute step S205 for determining whether the color of a text object included in the appearance image for the composite label acquired in step S5 matches a printing color in the cartridge 101 set for the bottommost label. When the CPU 31 determines in S205 that the printing color of the text object does not match the printing color of the cartridge 101 set for the bottommost label, in S210 the CPU 31 specifies a cartridge 101 for creating one (the topmost print label in this example) of the upper-layer print labels L that has the same printing color as the text object. Thus, the third embodiment can prevent the appearance of a text object being obscured by the color of an overlapping print label L for another layer.

One feature of the third embodiment is that the CPU 31 is directed to execute step S205 for determining whether the color of the text object included in the appearance image acquired in step S5 matches the printing color of the cartridge 101 set for the bottommost label, and step S215 for determining whether the background of the text object is configured of a single color. When the CPU 31 determines in S205 that the color of the text object matches the printing color of the cartridge 101 for the bottommost label and determines in S215 that the background of the text object is not configured of a single color, in step S70 the CPU 31 removes portions from objects to be printed in layers above the print label L for the bottommost label so that these objects are not printed in areas corresponding to the printing pattern of the text object (the areas corresponding to the text pattern are blanked out).

This method can reliably prevent a text object rendered in the bottommost label from being obscured by an upper-layer print label L arranged over the text object.

Another feature of the third embodiment is that the CPU 31 is directed to execute step S220 for determining whether the background color of the text object matches the tape color of the cartridge 101 set for the bottommost label. When the CPU 31 determines in S220 that the background color does not match the tape color of the cartridge 101 used for the bottommost label, then in S230 the CPU 31 specifies a cartridge 101 having the same tape color as the background color for the text object to be used for creating a print label L (topmost label in the example) forming a layer above the bottommost label.

In this way, when the background color of the text object differs from the tape color of the cartridge 101 for the bottommost label, the CPU 31 can reduce the number of labels being bonded together by specifying a cartridge 101 with the same tape as the background color of the text object for creating an upper-layer label (topmost label in the example).

While the disclosure has been described in detail with reference to the specific embodiment thereof, it would be apparent to those skilled in the art that various changes and modifications may be made therein without departing from the scope of the invention.

While the embodiments described above cover the case in which the operation terminal 3 executes all of the data conversion process including step S70 for issuing a print command to print the label datasets, the present disclosure is not limited to this configuration. The label printer 2 may also be directed to execute the entire data conversion process including step S70. In this case, the control circuit 21 of the label printer 2 is an example of the computing unit, and the touchscreen 41 is an example of the display. Alternatively, some of the process may be executed on the operation terminal 3 while the remainder is executed on the label printer 2. Alternatively, the entire process may be executed by a plurality of programs installed on the operation terminal 3. For example, the process up to step S65 may be executed according to the print data editing program, while step S70 is executed by a printer driver separate from the print data editing program.

Further, while the cartridge specified for creating the print label L constituting the bottommost layer has a tape color matching the printing color occupying the largest total area in the appearance image, the cartridge specified for creating the bottommost print label L may simply have a tape color equivalent to any printing color in the appearance image occupying a total area greater than or equal to a prescribed threshold. Further, this determination may be based on another attribute of the objects in the edited label dataset and is not limited to the total coverage area. When the object attribute used to determine a cartridge for creating the bottommost label is the background color of the object, then cartridges whose tape color is equivalent to the background color are specified as candidate cartridges.

Further, the print label L constituting the bottommost layer is not restricted to a label with a colored tape. A cartridge having a transparent tape may be specified for creating the bottommost print label L. When an object configured of another printing color in the appearance image exists outside the printing area in which the printing color with the largest total area is specified, a cartridge having a transparent tape and an ink ribbon whose color is equivalent to the printing color occupying the largest total area may be specified as the cartridge for creating the bottommost print label L. Further, when a shape of a bounding rectangle surrounding an image represented by the printing color having the largest total area has a different aspect ratio from the print label L, a cartridge having a transparent tape and an ink ribbon color matching the printing color occupying the largest total area may be specified as the cartridge for creating the bottommost print label L.

Further, the printing medium in the present embodiments is not limited to the cartridge 101 but may be roll paper having a printing surface and not accommodated in a cartridge case, and an ink ribbon configured separately from the cartridge 101, for example. In this case, the color of the roll paper is a tape color and the color of the ink ribbon is a printing color. The printing medium is also not limited to a continuous strip-like medium. The label printer 2 is also not limited to a thermal printer but may be any printer capable of printing print media having different medium colors or different printing colors.

The type of object subjected to the text object handling process described in the third embodiment is not limited to text objects but may be other specific types of objects. For example, the handling process of the third embodiment may be performed on objects that become indecipherable when their appearance is obscured, such as barcodes and two-dimensional codes.

The print labels are not limited to their use in composite labels but may also be used for forming a set of images. For example, a plurality of print labels may be created to form a single wide label with the print labels juxtaposed in the width direction.

In S70 the CPU 31 may transmit the plurality of label datasets to a plurality of printers so that each printer prints one or more received label datasets. In this case, in S120 the CPU 31 may acquire information on the usage history from each of the plurality of printers. The CPU 31 may transmit a label dataset to a printer having a usage history of the cartridge model number corresponding to the label dataset.

Further, the flowcharts shown in FIGS. 8, 10, 13, and 14 do not limit the present disclosure to the steps indicated therein. Steps may be added or deleted, or their order may be rearranged, without departing from the spirit and technical ideas of the disclosure.

In addition to what has already been described, the methods according to the embodiments and their modifications described above may be used in suitable combinations.

In addition, although not illustrated individually, the present disclosure may be implemented with various modifications, without departing from the spirit of the invention.

What is claimed is:

1. A non-transitory computer readable storage medium storing a set of program instructions installed on and executed by a computer provided in an information processing device, the set of program instructions comprising:
   acquiring an appearance image configured of a plurality of colors;
   identifying the plurality of colors configuring the acquired appearance image;
   performing a first color specification process to specify a first color having a largest area among areas each printed with corresponding one of the plurality of identified colors configuring the appearance image;
   specifying a plurality of printing medium types based on the plurality of identified colors, the plurality of printing medium types including a first printing medium type and a second printing medium type; and
   generating a first print dataset and a second print dataset by using the appearance image, the first print dataset corresponding to the specified first printing medium type, the second print dataset corresponding to the specified second printing medium type,
   wherein the specifying specifies the first printing medium type having a medium color equivalent to the specified first color so that the medium of the first printing medium type is used for creating a print label of a bottom layer on which another print label is overlaid.

2. The non-transitory computer readable storage medium according to claim 1, wherein the specifying specifies the second printing medium type so that the second printing medium type has a transparent medium.

3. The non-transitory computer readable storage medium according to claim 1, wherein a first print label is created by printing the printing medium of the first printing medium type based on the first print dataset and a second print label is created by printing the printing medium of the second printing medium type based on the second print dataset,
    wherein the first print dataset and the second print dataset are generated for creating a laminated label in which the second print label is overlaid on and bonded to a top surface of the first print label,
    wherein the specifying specifies the first printing medium type prior to specifying the second printing medium type based on the plurality of identified colors.

4. The non-transitory computer readable storage medium according to claim 1, wherein each of the plurality of printing medium types is classified according to a medium color and a printing color with which an image is printed on the medium, wherein the set of program instructions further comprises: performing a second color specification process to specify a second color different from the first color and from a printing color of the first printing medium type among the plurality of identified colors configuring the appearance image, wherein the specifying specifies the second printing medium type having a printing color equivalent to the second color.

5. The non-transitory computer readable storage medium according to claim 1, wherein a first print label is created by printing the printing medium of the first printing medium type based on the first print dataset and a second print label is created by printing the printing medium of the second printing medium type based on the second print dataset, the second print label being laid on and bonded to the first print label,
    wherein the generating generates the first print dataset and the second print dataset so that a second print length to be printed using the second print label is smaller than or equal to a first print length to be printed using the first print label.

6. The non-transitory computer readable storage medium according to claim 5, wherein each of the first printing medium type and the second printing medium type has a printing medium in an elongated form,
    wherein the set of program instructions further comprises:
        in a case that one or more marks indicating one or more borders are arranged at regular intervals in the appearance image, setting the second print length so that the second print length is one of one or more integer multiples of the regular interval and the second print length is a smallest multiple of the regular interval in which each object included in the second print dataset can be printed.

7. The non-transitory computer readable storage medium according to claim 1, wherein the set of program instructions further comprises:
    displaying on a display first printing medium type information, second printing medium type information, a first print image, and a second print image so that the first printing medium type information is in association with the first print image and the second printing medium type information is in association with the second print image, the first printing medium type information being information on the first printing medium type, the second printing medium type information being information on the second printing medium type, the first print image being represented by the first print dataset, and the second print image being represented by the second print dataset.

8. The non-transitory computer readable storage medium according to claim 7, wherein in the displaying, printing medium type information on a printing medium type whose usage history does not exist is displayed in a style different from a style of printing medium type information on a printing medium type whose usage history exists.

9. The non-transitory computer readable storage medium according to claim 8,
    wherein the set of program instructions further comprises:
        instructing to execute a printing process to print the generated first print dataset using a printing medium of the specified first printing medium type, and to print the generated second print dataset using a printing medium of the specified second printing medium type, the printing process transmits the first print dataset and the second print dataset to a printer; and
        acquiring usage history from the printer.

10. The non-transitory computer readable storage medium according to claim 1, wherein the plurality of printing medium types is classified into a first type group or a second type group,
    wherein the set of program instructions further comprises:
        acquiring settings information indicating either first settings or second settings, the first settings indicating that the first type group has a higher priority for use than the second type group, the second settings indicating that the second type group has a higher priority for use than the first type group; and
        in a case that the acquired settings information indicates second settings, specifying a printing medium type while prioritizing the second type group than the first type group.

11. The non-transitory computer readable storage medium according to claim 1, wherein each of the plurality of printing medium types specifies a type of a cartridge having a tape on which an image of one color can be printed.

12. A non-transitory computer readable storage medium storing a set of program instructions installed on and executed by a computer provided in an information processing device, the set of program instructions comprising:
    acquiring an appearance image configured of a plurality of colors;
    identifying the plurality of colors configuring the acquired appearance image;
    specifying a plurality of printing medium types based on the plurality of identified colors, the plurality of printing medium types including a first printing medium type and a second printing medium type; and
    generating a first print dataset and a second print dataset by using the appearance image, the first print dataset corresponding to the specified first printing medium type, the second print dataset corresponding to the specified second printing medium type,
    wherein a first print label is created by printing the printing medium of the first printing medium type based on the first print dataset and a second print label is created by printing the printing medium of the second printing medium type based on the second print dataset,
    wherein the first print dataset and the second print dataset are generated for creating a laminated label in which the second print label is overlaid on and bonded to a top surface of the first print label,
    wherein the specifying specifies the first printing medium type prior to specifying the second printing medium type based on the plurality of identified colors, wherein each of the plurality of printing medium types is classified according to a medium color and a printing color with which an image is printed on the medium, wherein the set of program instructions further comprises:

performing a first determination process to determine whether a color of a specific object, which is included in the acquired appearance image, matches the printing color of the first printing medium type; and specifying a third printing medium type in a case that the first determination process determines that the color of the specific object does not match the printing color of the first printing medium type, a medium of the third printing medium type being used to create a topmost-layer print label which is overlaid at a top among the plurality of print labels in the laminated label.

13. The non-transitory computer readable storage medium according to claim 12, wherein the set of program instructions further comprises:

a third determination process to determine whether a color of a background of the specific object matches a medium color of the first printing medium type; and specifying a fourth printing medium type having a medium color equivalent to the color of the background of the specific object in a case that the third determination process determines that the color of the background of the specific object does not match the medium color of the first printing medium type, a medium of the fourth printing medium type being used to create an upper-layer print label to be overlaid above the first print label.

14. A non-transitory computer readable storage medium storing a set of program instructions installed on and executed by a computer provided in an information processing device, the set of program instructions comprising:

acquiring an appearance image configured of a plurality of colors;

identifying the plurality of colors configuring the acquired appearance image;

specifying a plurality of printing medium types based on the plurality of identified colors, the plurality of printing medium types including a first printing medium type and a second printing medium type; and generating a first print dataset and a second print dataset by using the appearance image, the first print dataset corresponding to the specified first printing medium type, the second print dataset corresponding to the specified second printing medium type, wherein a first print label is created by printing the printing medium of the first printing medium type based on the first print dataset and a second print label is created by printing the printing medium of the second printing medium type based on the second print dataset, wherein the first print dataset and the second print dataset are generated for creating a laminated label in which the second print label is overlaid on and bonded to a top surface of the first print label, wherein the specifying specifies the first printing medium type prior to specifying the second printing medium type based on the plurality of identified colors, wherein each of the plurality of printing medium types is classified according to a medium color and a printing color with which an image is printed on the medium, wherein the set of program instructions further comprises:

performing a first determination process to determine whether a color of a specific object, which is included in the acquired appearance image, matches the printing color of the first printing medium type; and performing a second determination process to determine whether a background of the specific object is set to a single color, wherein in a case that the first determination process determines that the color of the specific object matches the printing color of the first printing medium type and the second determination process determines that the background of the specific object is not set to a single color, the second print dataset is generated so that at least a part of an area of an upper-layer object corresponding to an area of the specific object is not printed in the printing, the upper-layer object being to be printed by using the printing medium of the second printing medium type to create the upper-layer label which is to be overlaid above the first print label.

15. An information processing device comprising:

a controller configured to perform:

acquiring an appearance image configured of a plurality of colors;

identifying the plurality of colors configuring the acquired appearance image;

performing a first color specification process to specify a first color having a largest area among areas each printed with corresponding one of the plurality of identified colors configuring the appearance image;

specifying a plurality of printing medium types based on the plurality of identified colors, the plurality of printing medium types including a first printing medium type and a second printing medium type; and generating a first print dataset and a second print dataset by using the appearance image, the first print dataset corresponding to the specified first printing medium type, the second print dataset corresponding to the specified second printing medium type, wherein the specifying specifies the first printing medium type having a medium color equivalent to the specified first color so that the medium of the first printing medium type is used for creating a print label of a bottom layer on which another print label is overlaid.

* * * * *